United States Patent
Furumochi et al.

(10) Patent No.: US 10,349,028 B2
(45) Date of Patent: Jul. 9, 2019

(54) IMAGE PICKUP APPARATUS THAT DISPLAYS IMAGE BASED ON SIGNAL OUTPUT FROM IMAGE PICKUP DEVICE, METHOD OF CONTROLLING THE SAME, AND STORAGE MEDIUM

(71) Applicant: CANON KABUSHIKI KAISHA, Tokyo (JP)

(72) Inventors: Hiroyuki Furumochi, Musashimurayama (JP); Taro Kobayashi, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/814,729

(22) Filed: Nov. 16, 2017

(65) Prior Publication Data

US 2018/0077398 A1    Mar. 15, 2018

Related U.S. Application Data

(63) Continuation of application No. 14/564,418, filed on Dec. 9, 2014, now Pat. No. 9,854,216.

(30) Foreign Application Priority Data

Dec. 10, 2013  (JP) ................................ 2013-254910
Dec. 16, 2013  (JP) ................................ 2013-259304

(51) Int. Cl.
*H04N 5/232* (2006.01)
*H04N 5/343* (2011.01)
(Continued)

(52) U.S. Cl.
CPC ......... *H04N 9/735* (2013.01); *H04N 5/23212* (2013.01); *H04N 5/23219* (2013.01);
(Continued)

(58) Field of Classification Search
CPC .......... H04N 5/23293; H04N 5/23212; H04N 5/23219; H04N 5/343; H04N 5/3456; H04N 5/3742; H04N 9/735
See application file for complete search history.

(56) References Cited

U.S. PATENT DOCUMENTS 6,784,932 B1 * 8/2004 Okamoto ............. H04N 5/3658
                                                             250/208.1
6,972,799 B1   12/2005 Hashimoto
(Continued)

FOREIGN PATENT DOCUMENTS

CN      1856024 A      11/2006
CN    101193209 A       6/2008
(Continued)

OTHER PUBLICATIONS

Office Action issued in Chinese Appln. No. 201410756618.0 dated Jun. 20, 2017.
(Continued)

*Primary Examiner* — Lin Ye
*Assistant Examiner* — John H. Morehead, III
(74) *Attorney, Agent, or Firm* — Rossi, Kimms & McDowell LLP

(57) ABSTRACT

An image pickup apparatus that makes it unnecessary to temporarily stop image pickup performed by an image pickup device to thereby improve operability of the image pickup apparatus, and achieves power saving. In an image pickup apparatus having an electronic viewfinder function, first image signals for live view are acquired by thinning read lines of an image pickup device, and second image signals for AF evaluation value calculation are acquired from the other read lines at a higher speed than the first image signals, for simultaneous output with the first image signals. Reading of the second image signals is started when the state of the object of image data changed or when one (Continued)

photographing mode is changed to another by a user's operation, and is terminated when a reading termination condition set in advance in association with the reading start condition is satisfied.

17 Claims, 11 Drawing Sheets

(51) Int. Cl.
   *H04N 5/345* (2011.01)
   *H04N 9/73* (2006.01)
   *H04N 5/374* (2011.01)

(52) U.S. Cl.
   CPC ......... *H04N 5/23293* (2013.01); *H04N 5/343* (2013.01); *H04N 5/3456* (2013.01); *H04N 5/3742* (2013.01)

(56) References Cited

U.S. PATENT DOCUMENTS

| | | | | |
|---|---|---|---|---|
| 9,854,216 | B2* | 12/2017 | Furumochi | H04N 9/735 |
| 2008/0084486 | A1* | 4/2008 | Enge | H04N 5/232 348/239 |
| 2008/0259202 | A1* | 10/2008 | Fujii | H04N 5/23212 348/345 |
| 2009/0086083 | A1* | 4/2009 | Kunishige | G03B 13/32 348/345 |
| 2009/0140122 | A1* | 6/2009 | Suzuki | H04N 5/3696 250/201.2 |
| 2009/0148147 | A1* | 6/2009 | Fujii | G03B 13/32 396/128 |
| 2010/0194958 | A1* | 8/2010 | Honda | H04N 5/23212 348/311 |
| 2011/0267533 | A1 | 11/2011 | Hirose | |
| 2012/0044394 | A1* | 2/2012 | Komiya | H04N 5/3456 348/266 |
| 2012/0057034 | A1 | 3/2012 | Tanaka | |
| 2013/0038757 | A1* | 2/2013 | Haneda | H04N 5/23212 348/231.99 |
| 2013/0107067 | A1* | 5/2013 | Miyakoshi | H04N 5/23212 348/208.5 |
| 2014/0085512 | A1* | 3/2014 | Ikeda | H04N 5/343 348/240.2 |
| 2014/0160334 | A1 | 6/2014 | Wakabayashi | |
| 2014/0362269 | A1* | 12/2014 | Omori | H04N 5/378 348/308 |

FOREIGN PATENT DOCUMENTS

| | | |
|---|---|---|
| CN | 103095985 A | 5/2013 |
| JP | H11103412 A | 4/1999 |
| JP | 2009171004 A | 7/2009 |
| JP | 2009273023 A | 11/2009 |
| JP | 2010181751 A | 8/2010 |
| JP | 2012060371 A | 3/2012 |
| JP | 2013055589 A | 3/2013 |

OTHER PUBLICATIONS

Office Action issued in Japanese Patent Application No. 2013-259304 dated Aug. 29, 2017.

Office Action issued in U.S. Appl. No. 14/564,418 dated Sep. 12, 2016.

Office Action issued in U.S. Appl. No. 14/564,418 dated Apr. 21, 2017.

Notice of Allowance issued in U.S. Appl. No. 14/564,418 dated Aug. 23, 2017.

* cited by examiner

FIG. 4

| | | | | | | ROW NUMBER | AF SELECTION ROW | LIVE VIEW SELECTION ROW |
|---|---|---|---|---|---|---|---|---|
| R | G | R | G | R | G | 1 | ○ | |
| G | B | G | B | G | B | 2 | ○ | |
| R | G | R | G | R | G | 3 | | ○ |
| G | B | G | B | G | B | 4 | | ○ |
| R | G | R | G | R | G | 5 | | ○ |
| G | B | G | B | G | B | 6 | | ○ |
| R | G | R | G | R | G | 7 | | ○ |
| G | B | G | B | G | B | 8 | | ○ |

FIG. 10

| | | SUB STREAM READING START CONDITION | SUB STREAM READING TERMINATION CONDITION | PURPOSE |
|---|---|---|---|---|
| CONDITION A | MAIN OBJECT | WHEN MAIN OBJECT IS LOST OR IS ABOUT TO BE LOST (MOVED TO ANY OF FOUR CORNERS OF FRAME) | WHEN AE/AF/WB ARE PROPERLY PERFORMED ON MAIN OBJECT | TO SEARCH FOR NEXT MAIN OBJECT AT HIGH SPEED & PERFORM AE/AF/WB AT HIGH SPEED |
| | | WHEN MAIN OBJECT IS LOST OR IS ABOUT TO BE LOST (MOVED TO ANY OF FOUR CORNERS OF FRAME) | WHEN MAIN OBJECT CANNOT BE FOUND FOR A FEW FRAMES | TO SEARCH FOR NEXT MAIN OBJECT AT HIGH SPEED & PERFORM AE/AF/WB AT HIGH SPEED |
| | | WHEN MAIN OBJECT HAS MOVED CLOSE TO FRAME WORK | WHEN AE/AF/WB ARE PROPERLY PERFORMED ON MAIN OBJECT | TO PERFORM AE/AF/WB ON MAIN OBJECT AT HIGH SPEED |
| CONDITION B | FACE DETECTION | WHEN NUMBER OF FACES HAS INCREASED/DECREASED | WHEN AE/AF/WB ARE PROPERLY PERFORMED ON MAIN OBJECT | TO DETERMINE WHICH FACE IS TO BE SET AS MAIN OBJECT AT HIGH SPEED |
| | | WHEN FACE IS RECOGNIZED IN SMILE SHUTTER MODE | WHEN PHOTOGRAPHING IS COMPLETED/NO FACE IS DETECTED | TO PREVENT SMILE FROM BEING MISSED |
| CONDITION C | SCENE | WHEN THERE IS CHANGE IN SCENE DETERMINATION | WHEN AE/AF/WB ARE STABILIZED | TO PERFORM AE/AF/WB AT HIGH SPEED IN SCENE SUITED MANNER |
| | | WHEN THERE IS RAPID CHANGE IN AE/AF/WB EVALUATION VALUE | WHEN AE/AF/WB ARE STABILIZED | TO PERFORM AE/AF/WB AT HIGH SPEED |
| CONDITION D | MOVEMENT | WHEN OBJECT MOVES FAST | WHEN MOVEMENT IS STOPPED | TO PERFORM AE/AF/WB AT HIGH SPEED |
| CONDITION E | OPERATION | IMMEDIATELY AFTER REPRODUCTION MODE IS CHANGED TO PHOTOGRAPHING MODE BY MODE DIAL | WHEN AE/AF/WB ARE STABILIZED | TO PERFORM AE/AF/WB AT HIGH SPEED & PERFORM PHOTOGRAPHING AT HIGH SPEED |
| | | IMMEDIATELY AFTER PHOTOGRAPHING MODE IS CHANGED BY MODE DIAL | WHEN AE/AF/WB ARE STABILIZED | TO PERFORM AE/AF/WB AT HIGH SPEED |
| | | WHEN ZOOM MAGNIFICATION IS CHANGED | WHEN AE/AF/WB ARE STABILIZED | TO PERFORM AE/AF/WB AT HIGH SPEED |

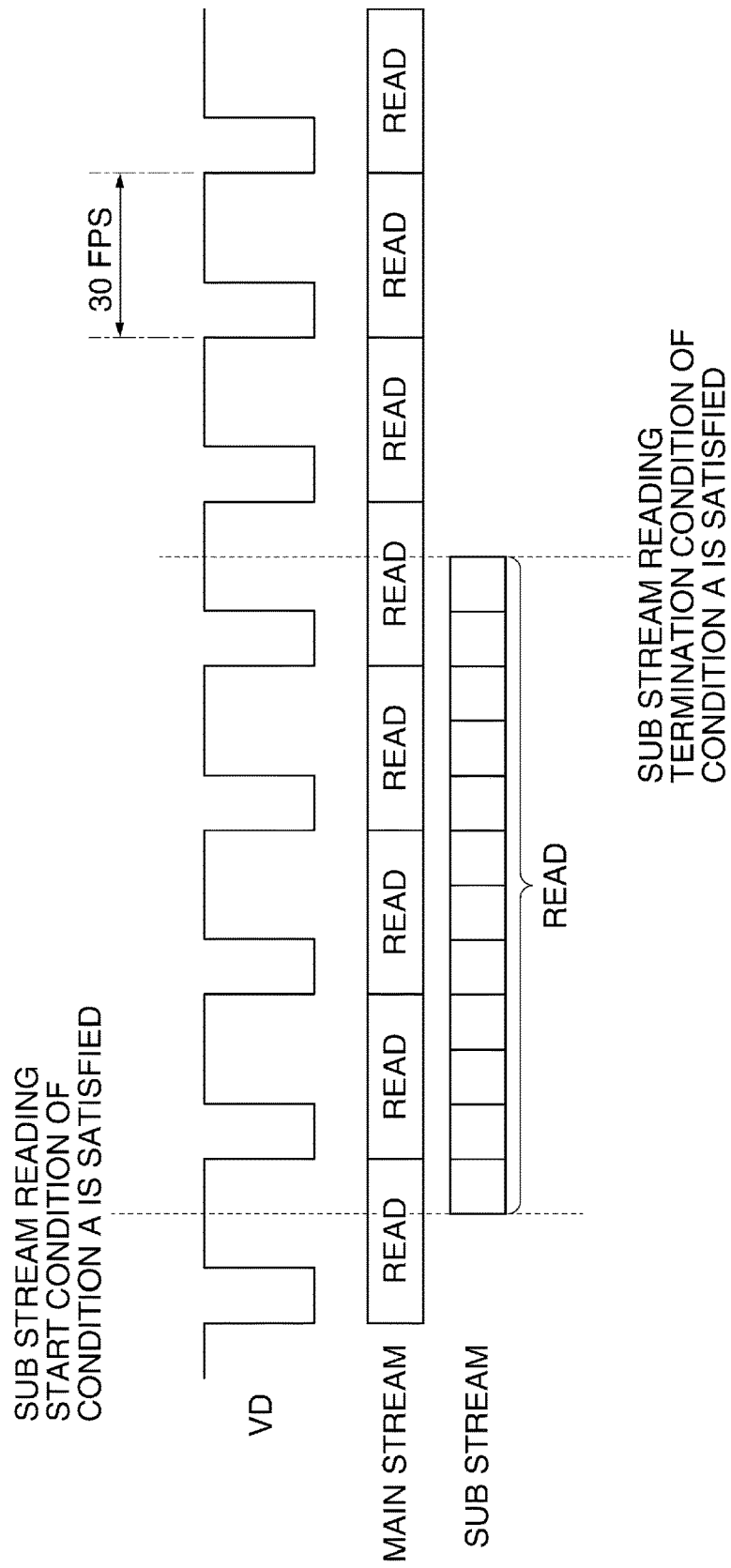

IMAGE PICKUP APPARATUS THAT DISPLAYS IMAGE BASED ON SIGNAL OUTPUT FROM IMAGE PICKUP DEVICE, METHOD OF CONTROLLING THE SAME, AND STORAGE MEDIUM

BACKGROUND OF THE INVENTION

Field of the Invention

The present invention relates to an image pickup apparatus having an electronic viewfinder function, such as a digital still camera and a digital video camera, a method of controlling the same, and a storage medium.

Description of the Related Art

Image pickup apparatuses, such as a digital still camera, include one having an electronic viewfinder function (EVF function) for displaying an image (moving image) of an object on an image display section of an apparatus body before photographing a still image. As a general operation of the electronic viewfinder function, a user checks a layout of an image to be photographed on the image display section, and when the user instructs the image pickup apparatus to photograph a still image e.g. by fully pressing a release button, the in-focus position is adjusted by an auto focus function, and then a still image is photographed and recorded.

In the process described above, a moving image displayed on the image display section is used for checking the image, and hence the frame rate in EVF processing is desired to be set to a relatively low rate, such as 30 fps, so as to reduce processing load. On the other hand, in performing auto-focus processing, it is necessary to more quickly determine the in-focus position to improve responsiveness of a series of processing operations from receiving a user's instruction to photographing a still image. Therefore, the frame rate in performing auto-focus processing is desired to be set to a higher rate, such as 240 fps.

Therefore, in general, a moving image of an object is displayed on the image display section at a low frame rate before photographing a still image, and when an instruction for photographing the still image is provided by a user's operation, the frame rate is changed to a high frame rate to perform auto-focus processing. However, in this case, when changing the frame rate, unnecessary waiting time is generated, which may cause undesired reduction of operability.

As a method of reducing such unnecessary waiting time, there has been proposed a technique that improves operability of a series of processing operations from receiving a photographing instruction by a user's operation to starting photographing of a still image, by simultaneously reading images from the image pickup device at a plurality of frame rates (see Japanese Patent Laid-Open Publication No. 2013-55589).

Further, there has been proposed an image pickup apparatus including a console section that outputs a temporary stop signal and a resume signal for temporarily stopping and resuming image pickup by an image pickup section, and a controller that controls image pickup by the image pickup section based on the temporary stop signal and the resume signal (see Japanese Patent Laid-Open Publication No. 2009-171004). In this proposal, image pickup performed by the image pickup section is temporarily stopped by a user's operation, whereby it is possible to perform photographing without recording an unnecessary object image.

However, in Japanese Patent Laid-Open Publication No. 2013-55589, during display of an object image on the image display section before photographing a still image, images are always simultaneously read out at the plurality of frame rates, which increases power consumption. Further, if images are simultaneously read out at the plurality of frame rates by the operation of pressing the release button, unnecessary waiting time is generated in changing the control of the image pickup device, and time lag caused by the waiting time reduces the operability of the camera.

On the other hand, in Japanese Patent Laid-Open Publication No. 2009-171004, image pickup by the image pickup section is temporarily stopped and resumed according to instructions provided by a user's operation, and hence it is impossible to determine based on object information whether or not a temporary stop period is required.

Further, conventionally, in the image pickup apparatus, the position information of an object for use in auto-focus control is obtained based on an image signal output from the image pickup device. Alternatively, the position information of an object is obtained based on a phase difference in an image indicated by an optical signal directly input to a dedicated detection device. In the case where the position information is obtained based on the image signal, the dedicated detection device can be dispensed with, and hence it is possible to reduce the size of the image pickup apparatus.

FIG. 7 is a timing diagram useful in explaining timing of an auto-focus image pickup operation (AF evaluation image pickup) of a conventional image pickup apparatus during live view.

In the conventional image pickup apparatus, the image pickup timing is defined by a vertical driving pulse (VD). When an AF control signal is turned on, an AF-evaluation image (image used for AF evaluation) is picked up by the image pickup apparatus according to the vertical driving pulse after a live view image pickup period. Then, when the AF control signal is turned off, the image pickup apparatus enters the live view image pickup period again.

As described above, the live view image pickup period during which a live view image is obtained and the AF operation period in which an AF evaluation image is obtained serially exist along the time axis, and hence the live view image and the AF evaluation image cannot be simultaneously picked up.

Therefore, the AF evaluation image is picked up during the AF operation period between the live view periods (live view frames), as shown in FIG. 7, and hence a time lag is inevitably generated between the live view image pickup and the AF evaluation image pickup.

Moreover, although the live view image display is performed even when the AF evaluation image is picked up, in this case, the live view image display is performed based on the AF evaluation image. As shown in FIG. 7, when the AF evaluation image is picked up, the frame rate is set to a higher rate than in the live view image pickup period, and hence a thinning ratio for reading by the image pickup device is increased, which inevitably degrades image quality. Therefore, it is difficult to avoid uncomfortable feeling due to degradation and fluctuation of image quality of the live view image.

To overcome this problem, there has been proposed an image pickup apparatus that is provided with focus detection pixels, separately from pixels for image pickup signals, in a pixel section of the image pickup device. As an example of the method of AF operation using the focus detection pixels, there has been known a so-called phase difference detection auto-focus (phase difference AF) method, as distinct from a contrast detection focus (contrast AF) method in which an in-focus position is detected based on an object image obtained from normal pixels (i.e. the pixels for image pickup signals).

In the contrast AF method, by paying attention to signals output from the image pickup device, particularly, high-frequency components (contrast information), a position of a photographic lens at which the evaluation value (contrast evaluation value) is largest is set to the in-focus position. In the contrast AF method, the contrast evaluation value is obtained while moving the photographic lens by a minute amount. Then, in the contrast AF control, it is necessary to drive the photographic lens until the position of the photographic lens is known at which the contrast evaluation value is largest.

On the other hand, in the phase difference AF method, a light flux passing through an emission pupil of the photographic lens is divided into two light fluxes, and the divided two fluxes are received by a pair of focus detection sensors (i.e. focus detection pixels), respectively. Then, a deviation amount between the image signals output in response to the light reception, i.e. a relative positional deviation amount in a direction of dividing the light flux is detected to thereby directly determine a deviation amount in a direction of focusing the photographic lens.

Therefore, in the phase difference AF method, by once performing an operation for accumulating electric charges using the focus detection sensors, it is possible to determine an amount of focus deviation and a direction thereof, whereby it is possible to perform the focus adjustment operation at a high speed.

To achieve both of high image quality of the live view image and high accuracy in focus detection, there has been proposed a technique of controlling an image pickup apparatus including an image pickup device with focus detection pixels in discrete arrangement, in which a manner of driving of the image pickup device is changed (see Japanese Patent Laid-Open Publication No. 2010-181751). In this technique, the image pickup apparatus has a first thinning read-out mode and a second thinning read-out mode which are different in at least one of a thinning ratio and a thinning phase, and selects the first thinning read-out mode or the second thinning read-out mode according to the state of the image pickup apparatus.

However, in the image pickup apparatus described in Japanese Patent Laid-Open Publication No. 2010-181751, when reading out the pixels, it is necessary to handle the focus detection pixels as defective pixels on the photographed image. For this reason, taking into account image quality of e.g. a still image using all pixels, it is difficult to arrange the focus detection pixels at a high density in all areas of the image pickup device.

Therefore, it is difficult to perform AF control with high accuracy by covering a sufficient angle-of-view area only with the focus detection pixels, and to improve the AF control performance, it is necessary to use the contrast AF method using the image signals in combination with the phase difference AF method using the focus detection pixels. In this case, in the contrast AF method, a time lag is generated due to the above-mentioned change of the manner of driving, and further, when degradation of image quality of the live view image is taken into account, the use of the phase difference AF method and the contrast AF method in combination makes it difficult to prevent a time lag from being generated, and image quality from being degraded.

In addition, if the use of the phase difference AF method and the contrast AF method in combination increases loads on both of the image pickup device driving and the image data processing circuit. Further, the use of the phase difference AF method and the contrast AF method in combination inevitably increases power consumption, so that electric power of a power source, such as a battery, is consumed in a short time period.

SUMMARY OF THE INVENTION

The present invention provides an image pickup apparatus that makes it unnecessary to temporarily stop image pickup performed by an image pickup device to thereby improve operability of the image pickup apparatus, and achieves power saving, a method of controlling the same, and a storage medium.

Further, the present invention provides an image pickup apparatus that is capable of preventing image quality of a live view image from being degraded, and reducing power consumption, while performing focus control at a high speed with high accuracy, a method of controlling the same, and a storage medium.

In a first aspect of the present invention, there is provided a image pickup apparatus that has an electronic viewfinder function for displaying an image of an object on an image display section before photographing the object, comprising a first readout unit configured to acquire image data to be displayed on the image display section from an image pickup device by thinning read lines, and output the acquired image data, a second readout unit configured to acquire image data from read lines of the image pickup device, which do not overlap with those read by the first readout unit, at a higher speed than the first readout unit, and output the acquired image data simultaneously with output of the image data from the first readout unit, a determination unit configured to determine whether or not a state of an object has changed, from the image data acquired by the first readout unit, a control unit configured to set at least one of a case where the determination unit determines that the state of the object of the image data acquired by the first readout unit has changed and a case where one photographing mode has been changed to another mode by a user's operation, as a reading start condition for starting reading by the second readout unit, and cause the reading by the second readout unit to be started when the reading start condition is satisfied, and be terminated when a reading termination condition set in advance in association with the reading start condition is satisfied.

In a second aspect of the present invention, there is provided an image pickup apparatus comprising an image pickup device that includes a plurality of pixels, and outputs image signals corresponding to an optical image, a readout unit configured to perform first reading for performing reading control of a first pixel group of the plurality of pixels to thereby acquire first image signals, and perform second reading for performing reading control of a second pixel group of the plurality of pixels to thereby acquire second image signals, a display control unit configured to display an image corresponding to the first image signals on the image display section, and a control unit configured to perform, when displaying the image corresponding to the first image signals acquired by the first reading on the image display section, second focus control based on the second image signals acquired by the second reading, in a case where an in-focus state cannot be acquired by first focus control performed based on the first image signals.

In a third aspect of the present invention, there is provided an image pickup apparatus comprising an image pickup device that includes a plurality of pixels which are two-dimensionally arranged, and a control unit configured to independently control a reading rate for each of different areas of the image pickup device, wherein the control unit starts control for reading a second area of the image pickup device, based on first image pickup signals acquired by performing reading control of a first area of the image pickup device.

In a fourth aspect of the present invention, there is provided a method of controlling an image pickup apparatus that has an electronic viewfinder function for displaying an image of an object on an image display section before photographing the object, comprising acquiring image data to be displayed on the image display section from an image pickup device by thinning read lines, and outputting the acquired image data, acquiring image data from read lines of the image pickup device, which do not overlap with those read by said first-mentioned reading, at a higher speed than said first-mentioned reading, and outputting the acquired image data simultaneously with said first-mentioned reading, determining whether or not a state of an object has changed, from the image data acquired by said first-mentioned reading, and setting at least one of a case where said determining determines that the state of the object of the image data acquired by said first-mentioned reading has changed and a case where one photographing mode has been changed to another mode by a user's operation, as a reading start condition for starting said second-mentioned reading, and cause said second-mentioned reading to be started when the reading start condition is satisfied, and be terminated when a reading termination condition set in advance in association with the reading start condition is satisfied.

In a fifth aspect of the present invention, there is provided a method of controlling an image pickup apparatus including an image pickup device that includes a plurality of pixels, and outputs image signals corresponding to an optical image, comprising performing reading control of a first pixel group of the plurality of pixels to thereby acquire first image signals, performing reading control of a second pixel group of the plurality of pixels to thereby acquire second image signals, displaying an image corresponding to the first image signals on a display section, and performing, when displaying the image corresponding to the first image signals acquired by the first-mentioned reading control on the display section, second focus control based on the second image signals acquired by the second-mentioned reading control, in a case where an in-focus state cannot be acquired by first focus control performed based on the first image signals.

In a sixth aspect of the present invention, there is provided a method of controlling an image pickup apparatus including an image pickup device that includes a plurality of pixels which are two-dimensionally arranged, comprising independently controlling a reading rate for each of different areas of the image pickup device, and starting reading control of a second area of the image pickup device, based on first image pickup signals acquired by performing reading control of a first area of the image pickup device.

In a seventh aspect of the present invention, there is provided a non-transitory computer-readable storage medium storing a computer-executable program for executing a method of controlling an image pickup apparatus having an electronic viewfinder function for displaying an image of an object on an image display section before photographing the object, wherein the method comprises acquiring image data to be displayed on the image display section from an image pickup device by thinning read lines, and outputting the acquired image data, acquiring image data from read lines of the image pickup device, which do not overlap with those read by said first-mentioned reading, at a higher speed than said first-mentioned reading, and outputting the acquired image data simultaneously with said first-mentioned reading, determining whether or not a state of an object has changed, from the image data acquired by said first-mentioned reading, and setting at least one of a case where said determining determines that the state of the object of the image data acquired by said first-mentioned reading has changed and a case where one photographing mode has been changed to another mode by a user's operation, as a reading start condition for starting said second-mentioned reading, and cause said second-mentioned reading to be started when the reading start condition is satisfied, and be terminated when a reading termination condition set in advance in association with the reading start condition is satisfied.

In an eighth aspect of the present invention, there is provided a non-transitory computer-readable storage medium storing a computer-executable program for executing a method of controlling an image pickup apparatus including an image pickup device that includes a plurality of pixels, and outputs image signals corresponding to an optical image, wherein the method comprises performing reading control of a first pixel group of the plurality of pixels to thereby acquire first image signals, performing reading control of a second pixel group of the plurality of pixels to thereby acquire second image signals, displaying an image corresponding to the first image signals on a display section, and performing, when displaying the image corresponding to the first image signals acquired by the first-mentioned reading control on the display section, second focus control based on the second image signals acquired by the second-mentioned reading control, in a case where an in-focus state cannot be acquired by first focus control performed based on the first image signals.

In a ninth aspect of the present invention, there is provided a non-transitory computer-readable storage medium storing a computer-executable program for executing a method of controlling an image pickup apparatus including an image pickup device that includes a plurality of pixels which are two-dimensionally arranged, wherein the method comprises independently controlling a reading rate for each of different areas of the image pickup device, and starting reading control of a second area of the image pickup device, based on first image pickup signals acquired by performing reading control of a first area of the image pickup device.

According to the present invention, by setting the conditions for starting and terminating reading pixels by the second readout unit, it is possible to make it unnecessary to temporarily stop image pickup by the image pickup device to thereby improve operability of the image pickup apparatus, and reduce power consumption.

According to the present invention, it is possible to prevent image quality of a live view image from being degraded, and reduce power consumption, while performing focus control at a high speed with high accuracy.

Further features of the present invention will become apparent from the following description of exemplary embodiments (with reference to the attached drawings).

BRIEF DESCRIPTION OF THE DRAWINGS

FIG. 4 is a diagram useful in explaining selection of pixels on a column signal line in a first chip appearing in FIG. 3.

FIG. 10 is a diagram showing conditions for controlling the start and end of reading a sub stream of the image pickup device during EVF display.

FIG. 11 is a timing diagram showing a control sequence executed for controlling the image pickup device, when the conditions A to E, shown in FIG. 10, are satisfied.

DESCRIPTION OF THE EMBODIMENTS

The present invention will now be described in detail below with reference to the accompanying drawings showing embodiments thereof.

Figure 1:
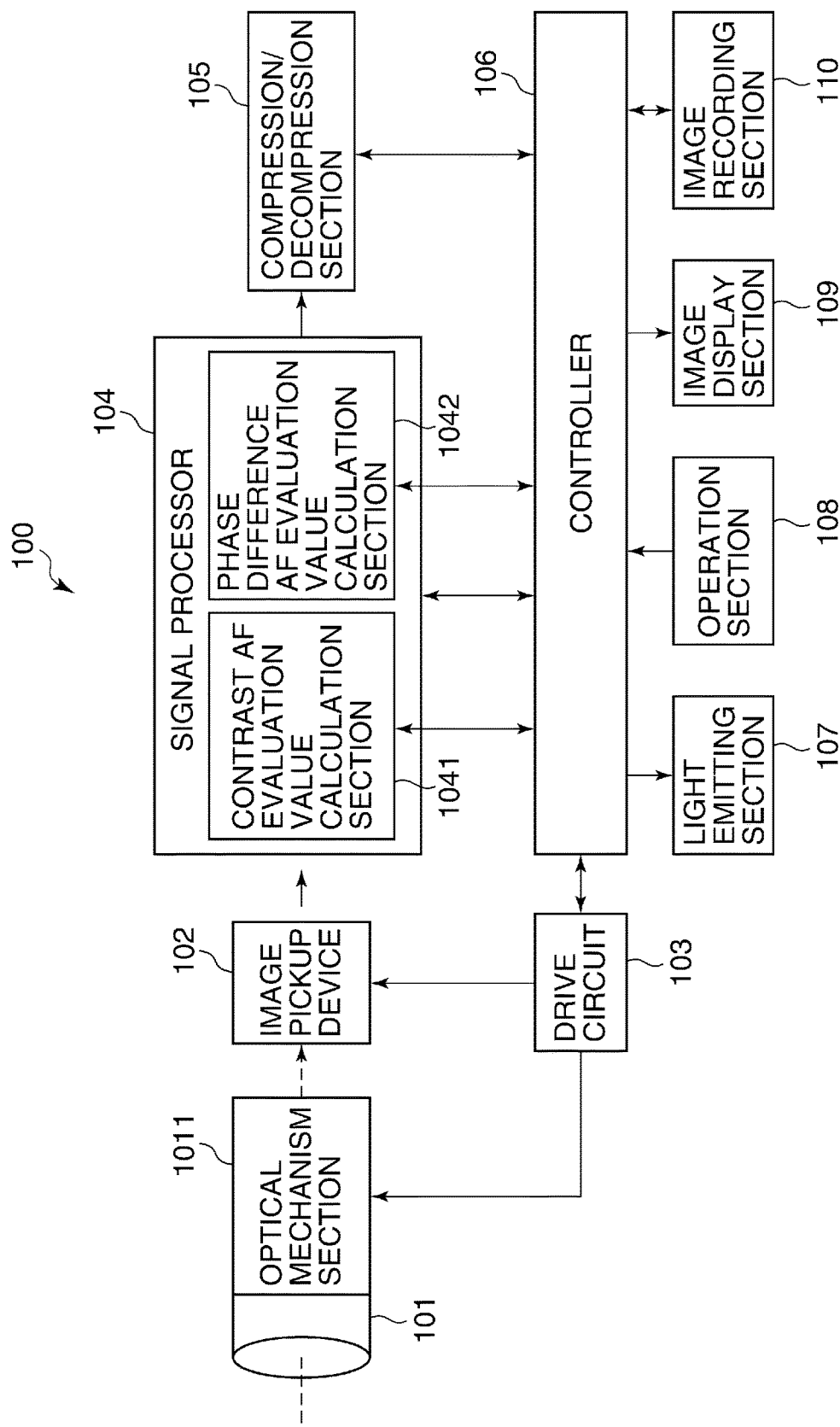
FIG. 1 is a block diagram of a digital still camera as an image pickup apparatus according to a first embodiment of the present invention.

FIG. 1 is a block diagram of an image pickup apparatus according to a first embodiment of the present invention.

The illustrated image pickup apparatus is, for example, a digital still camera with a moving image photographing function, or a video camera (hereinafter simply referred to as the camera). The camera, denoted by reference numeral 100, includes an optical lens barrel 101, an image pickup device 102, a drive circuit 103, a signal processor 104, a compression/decompression section 105, a controller 106, a light emitting section 107, an operation section 108, an image display section 109, and an image recording section 110.

The optical lens barrel 101 is comprised of a photographic lens unit (not shown, hereinafter simply referred to as the photographic lens) and an optical mechanism section 1011. The photographic lens collects light from an object on the image pickup device 102 (i.e. forms an optical image thereon).

Although not shown, the optical mechanism section 1011 includes an AF mechanism, a zoom driving mechanism, a mechanical shutter mechanism, an aperture mechanism, and so on. The optical mechanism section 1011 is driven by the drive circuit 103 under the control of the controller 106.

The image pickup device 102 includes pixels 201, described hereinafter, and an A/D converter (not shown), and is e.g. a so-called XY address-type CMOS image sensor. The image pickup device 102 is driven by the drive circuit 103 which operates under the control of the controller 106, to perform image pickup operation including exposure, signal reading, and reset, and thereby output image pickup signals (also referred to as the image signals).

The signal processor 104 performs predetermined signal processing on the image signals output from the image pickup device 102, including white balance adjustment processing, color correction processing, and AE (auto exposure) processing, and outputs image data. Further, the signal processor 104 includes a contrast AF evaluation value calculation section 1041 and a phase difference AF evaluation value calculation section 1042, described hereinafter.

The contrast AF evaluation value calculation section 1041 acquires contrast information indicative of contrast of image data based on image signals (image data) output from the image pickup device 102. Then, the contrast AF evaluation value calculation section 1041 calculates a contrast AF evaluation value (auto-focus evaluation value) based on the obtained contrast information at timing controlled by the controller 106.

Similarly, the phase difference AF evaluation value calculation section 1042 acquires phase difference information indicative of a phase difference based on focus detection image signals acquired from focus detection pixels provided in the image pickup device 102. Then, the phase difference AF evaluation value calculation section 1042 calculates a phase difference AF evaluation value (auto-focus evaluation value) based on the phase difference information at timing controlled by the controller 106.

These contrast AF evaluation value and phase difference AF evaluation value are sent from the contrast AF evaluation value calculation section 1041 and the phase difference AF evaluation value calculation section 1042 to the controller 106, respectively.

The compression/decompression section 105 operates under the control of the controller 106. The compression/decompression section 105 performs compression encoding processing on image data output from the signal processor 104 using a predetermined still image data format, such as a JPEG method, to thereby generate encoded image data. Note that JPEG is an abbreviation for Joint Photographic Coding Experts Group. Further, the compression/decompression section 105 performs decompression decoding processing on the encoded image data sent from the controller 106 to thereby generate decoded image data.

The compression/decompression section 105 may perform compression encoding/decompression decoding processing on moving image data using e.g. a MPEG (Moving Picture Experts Group) method.

The controller 106 is a micro controller including a CPU (Central Processing Unit), a ROM (Read Only Memory), a RAM (Random Access Memory), and so forth. The CPU controls the overall operation of the camera 100 by executing programs stored in the ROM.

When the controller 106 determines according to AE processing performed by the signal processor 104 that an exposure value of an object is low, the controller 106 controls the light emitting section 107 to illuminate the object by emitting light. As the light emitting section 107, a strobe device using a xenon tube or an LED light-emitting device is used for example.

The operation section 108 includes various operation keys, such as a shutter release button, a lever, and a dial, and provides an operation signal corresponding to an operation input by a user to the controller 106. The image display section 109 includes a display device, such as an LCD (Liquid Crystal Display), and an interface circuit which provides an interface with the display device, and displays an image corresponding to image data sent from the controller 106 on the display device.

The image recording section 110 is a recording medium, such as a portable semiconductor memory, an optical disk, an HDD (Hard Disk Drive), or a magnetic tape. The image recording section 110 stores encoded image data compressed and encoded by the compression/decompression section 105 as an image file. Further, the image recording section 110 reads out an image file designated by the controller 106, and outputs the image file to the controller 106. Then, the controller 106 decompresses and decodes the read encoded image data by the compression/decompression section 105 to thereby generate decoded image data.

Now, the basic operation of the camera 100, shown in FIG. 1, will be described.

For example, when photographing a still image, before photographing the still image (i.e. before the actual photographing operation is performed), the image pickup device 102 sequentially performs CDS processing and AGC processing on image signals output from the pixels 201, and then converts the image signals to digital image signals by the A/D converter. Then, the digital image signals are sent to the signal processor 104.

In the signal processor 104, the contrast AF evaluation value calculation section 1041 calculates a contrast AF evaluation value (contrast control information) based on the contrast information acquired from the image signals obtained by live view image pickup and image pickup for AF evaluation value calculation, described hereinafter. Then, the contrast AF evaluation value calculation section 1041 outputs the calculated contrast AF evaluation value to the controller 106.

Similarly, the phase difference AF evaluation value calculation section 1042 calculates a phase difference AF evaluation value (control information) based on the phase difference information obtained from the focus detection pixels, out of the image signals obtained by live view image pickup, described hereinafter. Then, the phase difference AF evaluation value calculation section 1042 outputs the calculated phase difference AF evaluation value to the controller 106.

The controller 106 determines a controlled variable of the optical mechanism section 1011 based on these AF evaluation values in a manner described hereinafter, and controls the drive circuit 103 according to the controlled variable. Thus, the optical mechanism section 1011 is driven by the drive circuit 103.

Further, the controller 106 determines based on the AF evaluation value whether or not image pickup for AF evaluation value calculation, described hereinafter, is required, and performs an AF mode determination process. Then, the controller 106 determines according to the determination result whether or not to perform image pickup for AF evaluation value calculation, and controls the drive circuit 103.

The signal processor 104 performs e.g. image quality correction processing on the digital image signals output from the image pickup device 102 to thereby generate camera-through image signals. Then, the signal processor 104 sends the camera-through image signals to the image display section 109 via the controller 106. This makes it possible to display a camera-through image (live view image) corresponding to the camera-through image signals on the image display section 109, and enables the user to adjust the angle of view while visually checking the camera-through image.

If the shutter release button of the operation section 108 is pressed in a state where the camera-through image is displayed on the image display section 109, the controller 106 causes the drive circuit 103 to take one frame of image pickup signals (digital image signals) from the image pickup device 102 into the signal processor 104. The signal processor 104 performs image quality correction processing on the one frame of digital image signals, and sends the processed digital image signals (image data) to the compression/decompression section 105.

The compression/decompression section 105 compresses and encodes the image data, and sends the encoded image data to the image recording section 110 via the controller 106. As a consequence, an image file associated with the photographed still image is recorded in the image recording section 110.

When reproducing the image file recorded in the image recording section 110, the controller 106 reads the image file from the image recording section 110, which is selected according to an operation input from the operation section 108. Then, the controller 106 sends the image file to the compression/decompression section 105, where the image file is decompressed and decoded, whereby decoded image data is acquired. The controller 106 sends the decoded image data to the image display section 109, whereby the still image is reproduced and displayed on the image display section 109 based on the decoded image data.

On the other hand, when recording moving image data, the controller 106 causes the drive circuit 103 to take digital image signals output from the image pickup device 102 into the signal processor 104. The signal processor 104 sequentially processes the digital image signals to generate image data (i.e. moving image data). The generated moving image data is compressed and encoded by the compression/decompression section 105, and the encoded moving image data is sequentially transferred to the image recording section 110, and is recorded as a moving image file.

When reproducing the moving image file recorded in the image recording section 110, the controller 106 reads the moving image file from the image recording section 110, which is selected according to an operation input from the operation section 108. Then, the controller 106 sends the moving image file to the compression/decompression section 105, where the moving image file is decompressed and decoded, whereby decoded moving image data is acquired. The controller 106 sends the decoded moving image data to the image display section 109, whereby the moving image is reproduced and displayed on the image display section 109 based on the decoded moving image data.

Figure 2:
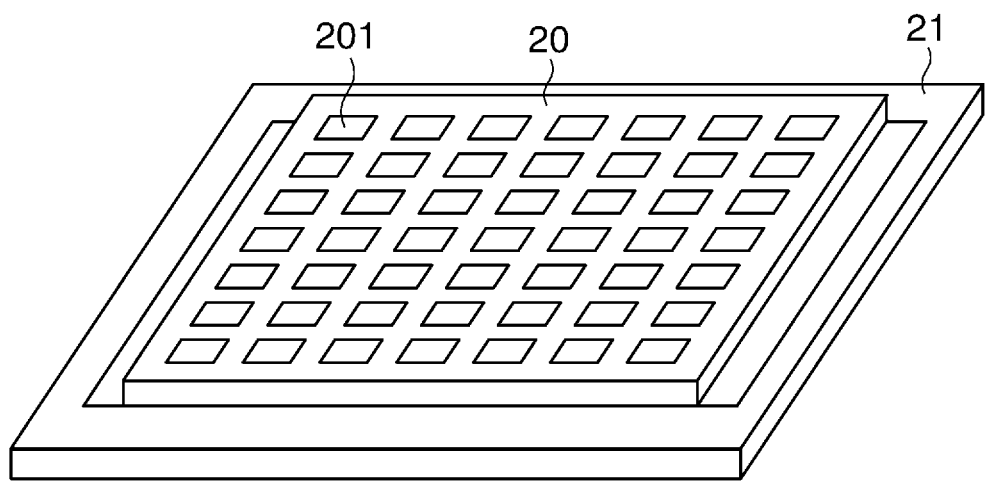
FIG. 2 is a perspective view of a structure of an image pickup device appearing in FIG. 1.

FIG. 2 is a perspective view of the image pickup device 102 appearing in FIG. 1.

Referring to FIG. 2, the image pickup device 102 includes a first chip 20 and a second chip 21, and the first chip 20 (first device section) is laminated on the second chip 21 (second device section). The first chip 20 includes a plurality of the pixels 201 arranged in a matrix, and is disposed on a light incident side (i.e. an optical image-receiving side) of the image pickup device 102. Formed on the second chip 21 are pixel driving circuits, including column scanning circuits 213-a and 213-b, and a row scanning circuit 212, described hereinafter.

By thus forming the pixels 201 on the first chip 20, and the pixel driving circuits on the second chip 21, it is possible to divide the manufacturing process of the image pickup device 102 into a manufacturing process of the peripheral circuits and a manufacturing process of the pixel sections. This makes it possible to achieve thinning of wiring in the peripheral circuits, higher speed by increasing density, downsizing, and even greater functionality.

Figure 3:
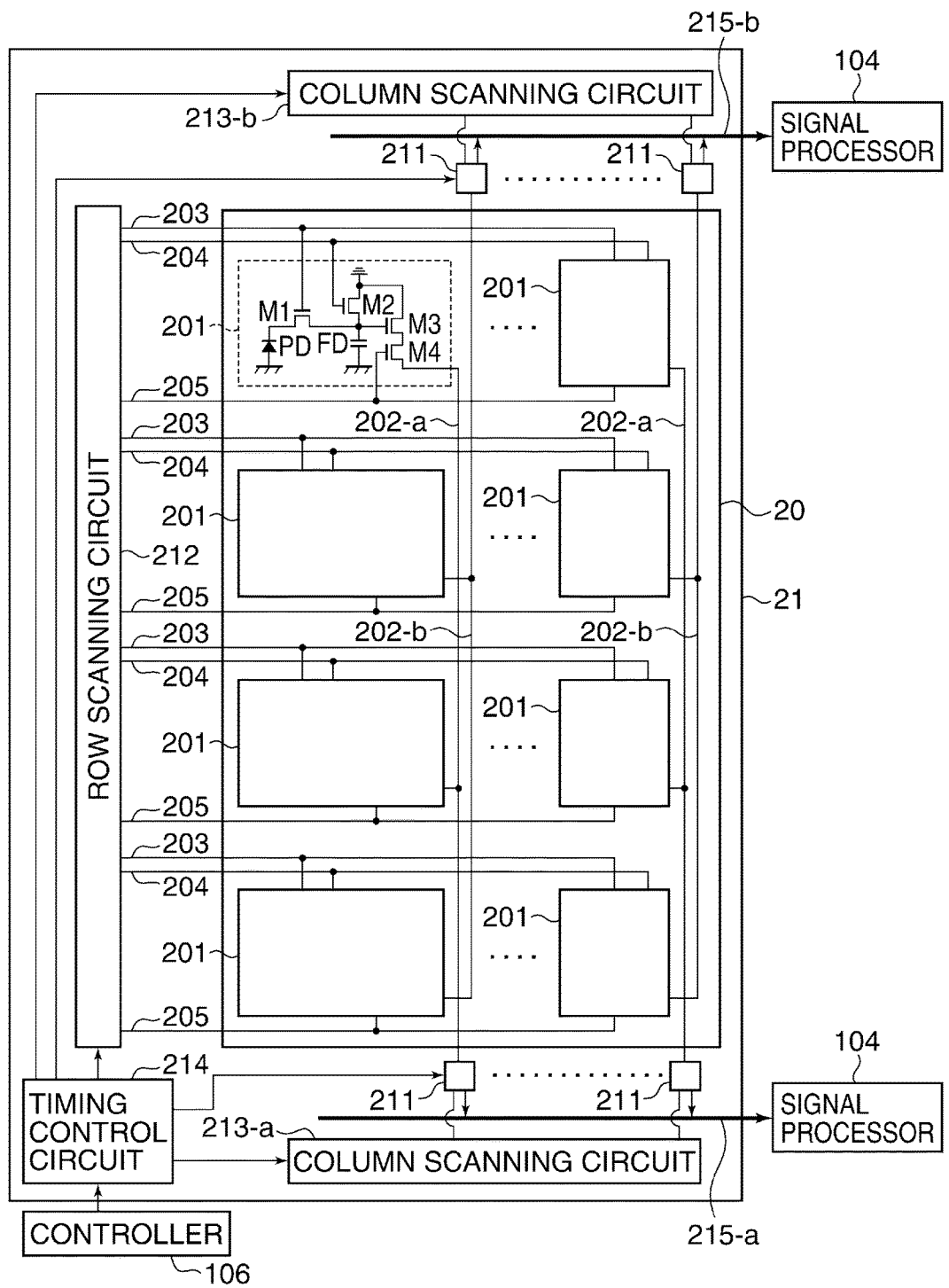
FIG. 3 is a block diagram of the image pickup device shown in FIG. 2.

FIG. 3 is a block diagram of the image pickup device 102 shown in FIG. 2.

In the first chip 20, the pixels 201 are arranged in a two-dimensional matrix. The pixels 201 are connected in a horizontal direction (row direction) to transfer signal lines 203, reset signal lines 204, and row selection signal lines 205, and are connected in a vertical direction (column direction) to column signal lines 202-a and 202-b. Note that the column signal lines 202-*a* and 202-*b* are different in connection destination in a manner associated with respective different read-out rows.

As shown in FIG. 3, each pixel 201 includes a photo diode PD which is a photoelectric conversion element, a transfer transistor M1, a reset transistor M2, an amplifier transistor M3, a selection transistor M4, and a floating diffusion FD.

Note that in the illustrated example, each transistor is an n-channel MOSFET (MOS Field-Effect Transistor).

The transfer transistor M1, the reset transistor M2, and the selection transistor M4 have gates to which the transfer signal line 203, the reset signal line 204, and the row selection signal line 205 are connected, respectively. These signal lines 203 to 205 extend in the horizontal direction, and the pixels on the same row are simultaneously driven. This makes it possible to control the operation of a line-sequential operation rolling shutter or an all-row simultaneous operation global shutter. Further, the selection transistor M4 has a source to which the column signal line 202-*a* or 202-*b* is connected on a row basis.

The photo diode PD accumulates electric charges generated by photoelectric conversion. The photo diode PD has a P-side connected to ground, and an N-side connected to a source of the transfer transistor M1. When the transfer transistor M1 is turned on, the electric charges in the photo diode PD are transferred to the floating diffusion FD. The floating diffusion FD has a parasitic capacity, and the transferred electric charges are accumulated in the floating diffusion FD.

The amplifier transistor M3 has a drain to which a power supply voltage Vdd is applied, and a gate connected to the floating diffusion FD. The amplifier transistor M3 amplifies and converts the accumulated electric charge (i.e. voltage) in the floating diffusion FD to a voltage signal. The selection transistor M4 is for selecting a pixel to read the voltage signal on a row-by-row basis, and has a drain connected to a source of the amplifier transistor M3. Further, the selection transistor M4 has a source connected to one of the column signal lines 202*a* and 202*b* (each generically referred to as the column signal line 202).

When the selection transistor M4 is turned on, a voltage signal corresponding to the voltage of the floating diffusion FD is output to the column signal line 202. The reset transistor M2 has a drain to which the power supply voltage Vdd is applied, and a source connected to the floating diffusion FD. When the reset transistor M2 is turned on, the voltage of the floating diffusion FD is reset to the power supply voltage Vdd.

The second chip 21 is provided with column ADC blocks 211, each of which is connected to the column signal line 202-*a* or 202-*b*. The second chip 21 is further provided with the row scanning circuit 212, the column scanning circuits 213-*a* and 213-*b*, a timing control circuit 214, and horizontal signal lines (output unit) 215-*a* and 215-*b*.

The timing control circuit 214 controls the timing of operations of the row scanning circuit 212, the column scanning circuits 213-*a* and 213-*b*, and the column ADC blocks 211. The row scanning circuit 212 scans the rows, and the column scanning circuits 213-*a* and 213-*b* scan the respective sets of the columns.

The horizontal signal lines 215-*a* and 215-*b* transfer output signals (image signals) from the column ADC blocks 211 according to the timing controlled by the column scanning circuits 213-*a* and 213-*b*, respectively.

As described hereinafter, the image signals transferred to the horizontal signal line 215-*a* are provided to the signal processor 104 as the image signals for live view. On the other hand, the image signals transferred to the horizontal signal line 215-*b* are provided to the signal processor 104 as the image signals for AF evaluation value calculation.

FIG. 4 is a diagram useful in explaining selection of pixels on the column signal lines 202-*a* or 202-*b* in the first chip 20 appearing in FIG. 3.

FIG. 4 shows pixels in eight rows×six columns, and here the pixels are arranged in a Bayer array. As a result of the AF mode determination process, if it is determined that image pickup for AF evaluation value calculation (second image pickup mode) is required, the read lines in the image pickup device 102 are divided so as to make it possible to simultaneously perform image pickup for live view (first image pickup mode) and image pickup for AF evaluation value calculation (second image pickup mode). The AF mode determination process will be described hereinafter.

At this time, the image signals for live view (first image signals, i.e. image display signals) are output to the column signal lines 202-*a*, and the image signals for AF evaluation value calculation (second image signals) are output to the column signal lines 202-*b*.

In FIG. 4, the row numbers 1 and 2 are AF selection rows for the AF evaluation value calculation image pickup (second pixel group, second area), and the row numbers 3 to 8 are live view selection rows for live view image pickup (first pixel group, first area). In the illustrated example, scan reading is sequentially performed on a row-by-row basis, and is repeatedly performed on each eight rows. Note that the focus detection pixels (not shown) used for the phase difference AF control are arranged in the first pixel group at predetermined intervals, and phase difference AF processing can be performed simultaneously with the live view display.

In the AF evaluation value calculation image pickup, the pixels are read by thinning three pixels of each four vertically-arranged pixels of the same color, with importance placed on the frame rate. On the other hand, in the live view image pickup, the pixels are read by thinning one pixel of each four vertically-arranged pixels of the same color and adding three pixels, with importance placed on image quality.

In other words, in the AF evaluation value calculation image pickup, the second pixel group is read out at a second frame rate. In the live view image pickup, the first pixel group is read out at a first frame rate lower than the second frame rate.

As described above, by dividing the pixels between pixel rows for the AF scanning image pickup and pixel rows for the live view image pickup according to selected rows, it is possible to acquire image signals at different frame rates, which are different in electric charge accumulation period and data size.

Next, the voltage signals (analog signals) output to the column signal lines 202-*a* and 202-*b* are converted from the analog signals to the digital signals (image signals) in the column ADC blocks 211 appearing in FIG. 3.

The image signals as outputs from the column ADC blocks 211 are read out therefrom to the horizontal signal line 215-*a* or 215-*b* by the column scanning circuit 213-*a* or 213-*b*. The image signals read out to the horizontal signal lines 215-*a* and 215-*b* are sent to the signal processor 104.

As a result of the AF mode determination process, described hereinafter, if it is determined that image pickup for AF evaluation value calculation (second photographing mode) is not required, although image pickup for live view (first photographing mode) is performed, image pickup for AF evaluation value calculation (second photographing mode) is not performed. In other words, the image signals are not read out to the column signal line 202-*b*, and the column scanning circuit 213-*b* is not operated, and hence no image signal is output from the horizontal signal line 215-*b*. Therefore, when image pickup for AF evaluation value calculation is not required, power consumption is reduced.

In the above-described example, the description is given of the case where the image signals are not read out to the column signal line 202-*b*. However, when image pickup for AF evaluation value calculation (second photographing mode) is not performed, calculation of the AF evaluation value (i.e. the phase difference AF evaluation value) is not performed, and hence to which block power supply is to be stopped can be determined as desired.

In the following description, when performing image pickup, an output path using the column signal lines 202-*a* and the horizontal signal line 215-*a* is referred to as the channel Ch1, and an output path using the column signal lines 202-*b* and the horizontal signal line 215-*b* is referred to as the channel Ch2.

Figure 5:
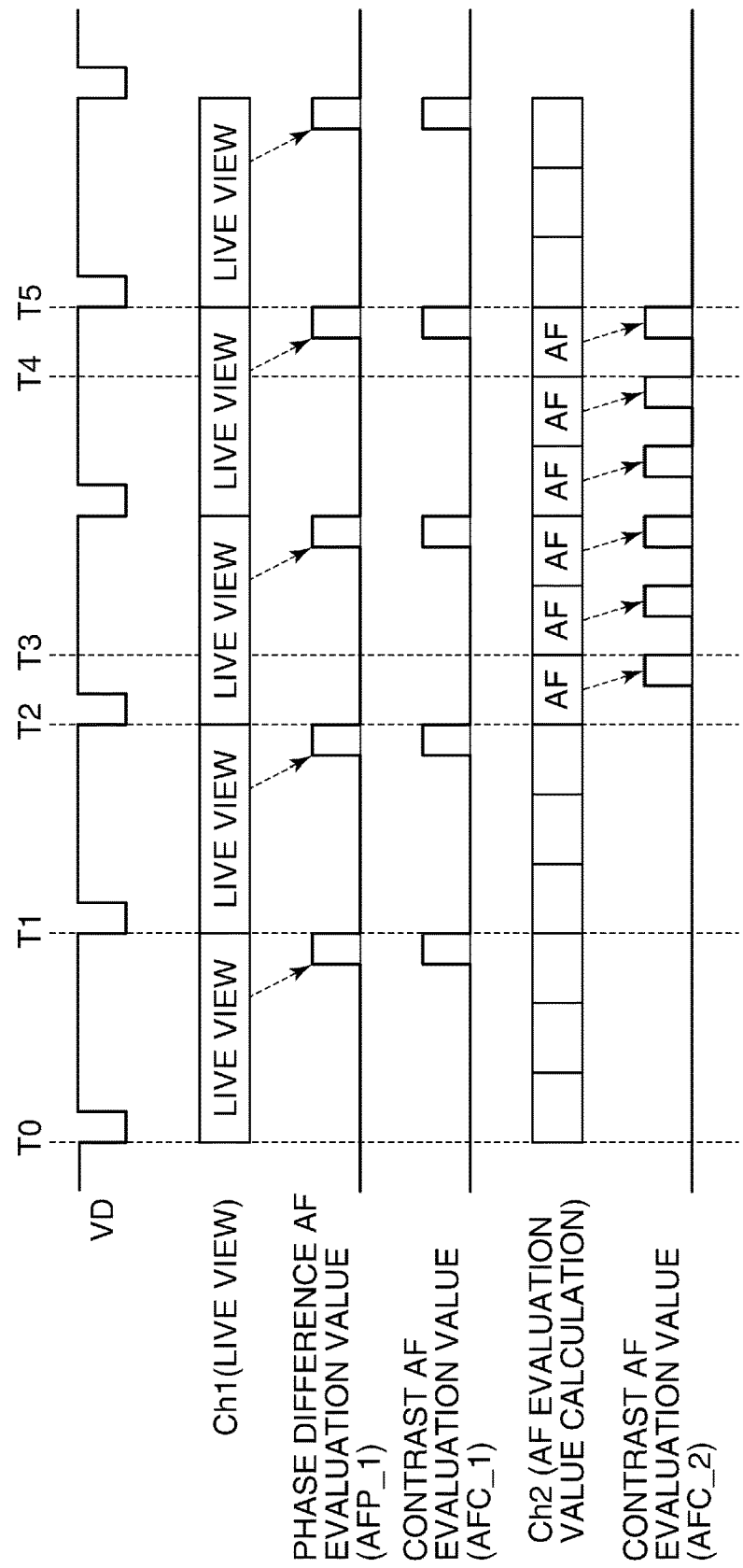
FIG. 5 is a timing diagram useful in explaining image pickup timing in an AF evaluation mode in the digital still camera shown in FIG. 1.

FIG. 5 is a timing diagram useful in explaining the image pickup timing in an AF evaluation mode in the camera 100 shown in FIG. 1.

As shown in FIG. 5, the image pickup timing is defined by the vertical driving pulse (VD), and in this example, to simplify the explanation, it is assumed that the frame rate in image pickup for AF evaluation value calculation is set to a frame rate three times higher than the frame rate in image pickup for live view. The image signals obtained by image pickup for live view are used for live view display, and it is assumed that the live view display is always performed. When the live view image pickup is started, reading of the image signals by image pickup for AF evaluation value calculation is not performed.

Image signals obtained by image pickup for live view (referred to as the first image signals) for frames during a time period from T0 to T1 are used for live view display. Further, image signals obtained from the focus detection pixels (i.e. phase difference detection pixels) (referred to as the first image information) are input to the phase difference AF evaluation value calculation section 1042, and image signals obtained from the other pixels (referred to as the second image information) are input to the contrast AF evaluation value calculation section 1041.

The phase difference AF evaluation value calculation section 1042 calculates a phase difference AF evaluation value AFP_1 based on the first image information. Further, the contrast AF evaluation value calculation section 1041 calculates a contrast AF evaluation value AFC_1 based on the second image information. Then, the controller 106 performs the AF mode determination process based on the phase difference AF evaluation value AFP_1 and the contrast AF evaluation value AFC_1. The controller 106 starts image pickup for AF evaluation value calculation only when it is determined as a result of the AF mode determination process that image pickup for AF evaluation value calculation is required.

Then, image signals obtained by image pickup for live view for frames during a time period from T1 to T2 are used for live view display. The phase difference AF evaluation value AFP_1 and the contrast AF evaluation value AFC_1 are calculated by the phase difference AF evaluation value calculation section 1042 and the contrast AF evaluation value calculation section 1041 in the similar manner, respectively. Then, the controller 106 performs the above-mentioned AF mode determination process, and if it is determined that image pickup for AF evaluation value calculation is required, the controller 106 starts reading of the image signals by image pickup for AF evaluation value calculation (i.e. for calculation of the AF evaluation value) at a time point T2.

Image signals obtained by image pickup for AF evaluation value calculation (i.e. channel Ch2) for frames during a time period from T2 to T3 are input to the contrast AF evaluation value calculation section 1041. Then, the contrast AF evaluation value calculation section 1041 calculates the contrast AF evaluation value AFC_2 based on the image signals (second image signals) obtained by image pickup for AF evaluation value calculation (channel Ch2).

The controller 106 performs the AF mode determination process based on the contrast AF evaluation value AFC_2 to determine whether or not the camera is in an in-focus state. If it is determined that the camera is not in the in-focus state, the controller 106 continues reading of the image signals by image pickup for AF evaluation value calculation and AF operation.

On the other hand, let it be assumed, for example, as a result of the AF operation by image pickup for AF evaluation value calculation (i.e. as a result of the AF operation based on the contrast AF evaluation value AFC_2), that the controller 106 determines at a time point T4 that the camera is in the in-focus state by the AF operation by image pickup for AF evaluation value calculation. In this case, the controller 106 checks the AF evaluation values (i.e. the phase difference AF evaluation value AFP_1 and the contrast AF evaluation value AFC_1) based on the image signals obtained by image pickup for live view. Then, if the controller 106 determines that the camera is in the in-focus state based on these AF evaluation values, the controller 106 stops reading of image signals by image pickup for AF evaluation value calculation at a time point T5.

Figure 6:
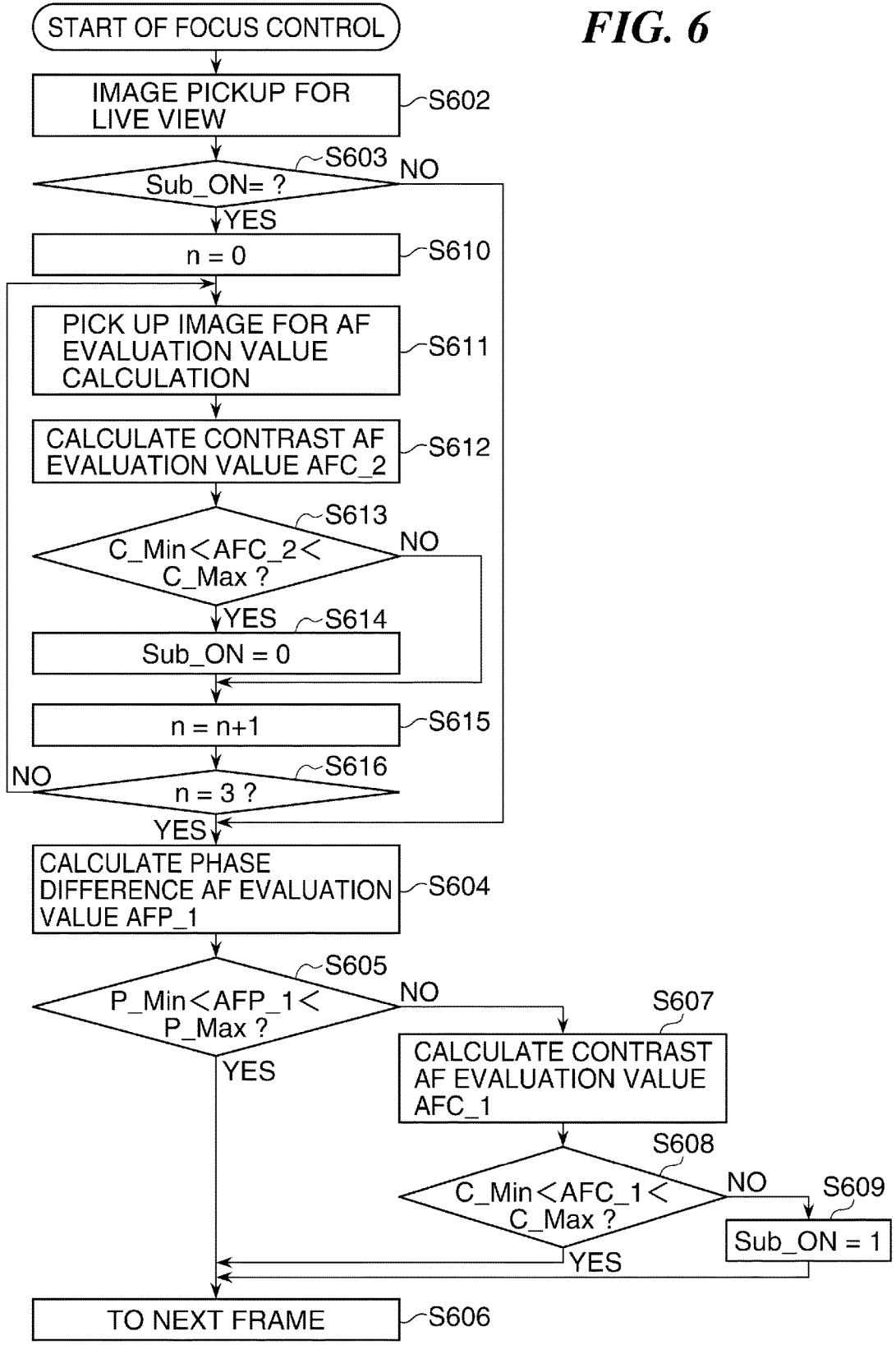
FIG. 6 is a flowchart of a focus control process performed by the digital still camera.
Figure 7:
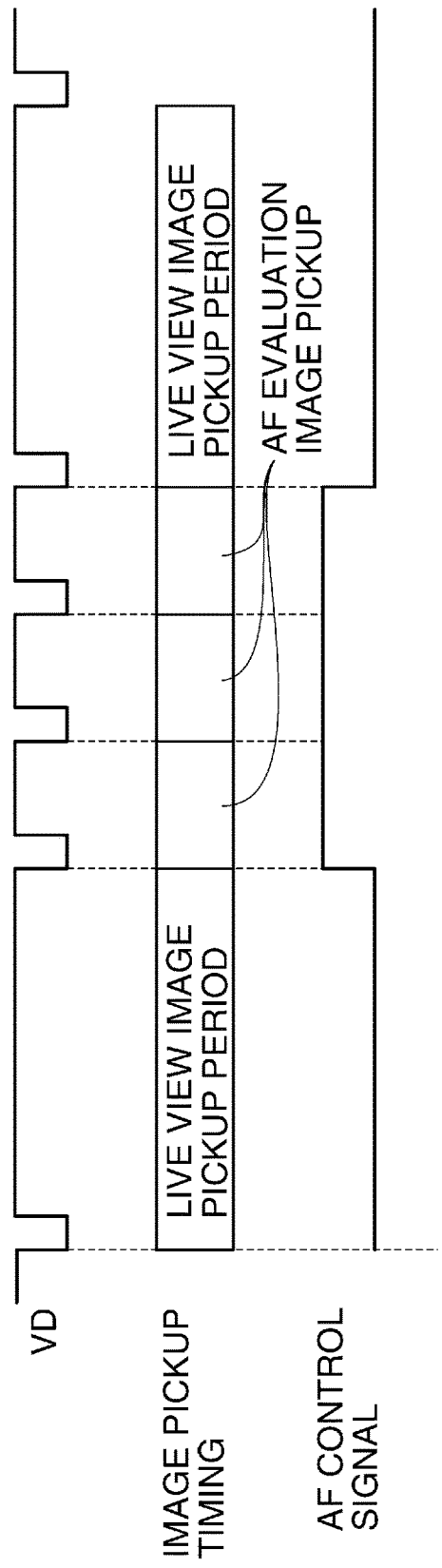
FIG. 7 is a timing diagram useful in explaining the timing of an auto-focus image pickup operation performed by a conventional image pickup apparatus during live view.

FIG. 6 is a flowchart of a focus control process performed by the camera 100 shown in FIG. 1. The focus control process in FIG. 6 is performed under the control of the controller 106.

When the power of the camera 100 is turned on, whereby the state of the camera 100 is changed to the photographing mode by the operation section 108, the controller 106 starts image pickup for live view as described above (step S602). In the live view image pickup, as described with reference to FIG. 4, the live view selection rows are read out, and the pixels read at this time include the focus detection pixels used for the phase difference AF control.

Although in the step S602, the image signals by image pickup for live view are subjected to image processing and display on a screen as a moving image for live view or recording, description thereof is omitted.

Next, the controller 106 checks whether or not an AF evaluation value calculation image pickup execution flag Sub_ON is equal to 1 (step S603). Note that when image pickup for live view is started, the AF evaluation value calculation image pickup execution flag Sub_ON is equal to 0.

If the AF evaluation value calculation image pickup execution flag Sub_ON is not equal to 1 (NO to the step S603), i.e. if the AF evaluation value calculation image pickup execution flag Sub_ON is equal to 0, the phase difference AF evaluation value calculation section 1042 calculates the phase difference AF evaluation value AFP_1 (first phase difference evaluation value which is a first evaluation value) based on the image signals obtained from the focus detection pixels by image pickup for live view under the control of the controller 106 (step S604). Then, the controller 106 calculates a feedback controlled variable based on the phase difference AF evaluation value AFP_1, and drivingly controls the drive circuit 103 to drive the AF mechanism provided in the optical mechanism section 1011 according to the calculated feedback controlled variable.

Next, the controller 106 determines whether or not the phase difference AF evaluation value AFP_1 is within a range (phase difference threshold value range) defined by a phase difference minimum threshold value P_Min and a phase difference maximum threshold value P_Max, set in advance. That is, the controller 106 determines whether or not P_Min<AFP_1<P_Max holds (step S605).

In this step, before performing the AF mode determination process, the controller 106 determines whether or not the phase difference AF evaluation value AFP_1 is within the range defined by the phase difference minimum threshold value P_Min and the phase difference maximum threshold value P_Max. Then, if the value is within the range, the controller 106 determines that the in-focus position can be estimated by the phase difference AF control (i.e. first focus control can be performed), and the high-speed AF operation is not required to be further performed.

If P_Min<AFP_1<P_Max holds (YES to the step S605), the controller 106 shifts to photographing of the next frame according to the vertical driving pulse VD (step S606). Note that processing for photographing the next frame starts from the step S602.

The contrast AF evaluation value calculation section 1041 operates under the control of the controller 106. If AFP_1≤P_Min or P_Max≤AFP_1 holds (NO to the step S605), the contrast AF evaluation value calculation section 1041 calculates the contrast AF evaluation value AFC_1 (step S607). In this step, the contrast AF evaluation value AFC_1 (first contrast evaluation value which is a first evaluation value) is calculated based on the image signals obtained by image pickup for live view. Then, the controller 106 calculates the feedback controlled variable based on the contrast AF evaluation value AFC_1, and drivingly controls the drive circuit 103 to drive the AF mechanism provided in the optical mechanism section 1011 according to the calculated feedback controlled variable.

Next, the controller 106 determines whether or not the contrast AF evaluation value AFC_1 is within a range (contrast threshold value range) defined by a contrast minimum threshold value C_Min and a contrast maximum threshold value C_Max, set in advance. That is, the controller 106 determines whether or not C_Min<AFC_1<C_Max holds (step S608).

In this step, the controller 106 determines whether or not the contrast AF evaluation value AFC_1 is within the range defined by the contrast minimum threshold value C_Min and the contrast maximum threshold value C_Max. Then, if the value is within the range, the controller 106 determines that the in-focus position can be estimated by the contrast AF control (i.e. the first focus control can be performed), and the high-speed AF operation is not required to be further performed.

If C_Min<AFC_1<C_Max holds (YES to the step S608), the controller 106 proceeds to the step S606. On the other hand, if AFC_1≤C_Min or C_Max≤AFC_1 holds (NO to the step S608), the controller 106 determines that the current frame is not in the in-focus state. Then, the controller 106 sets the AF evaluation value calculation image pickup execution flag Sub_ON to 1 to perform the high-speed AF operation by image pickup for AF evaluation value calculation from the next frame (step S609). That is, the controller 106 determines to perform second focus control. Then, the controller 106 proceeds to the step S606.

If the AF evaluation value calculation image pickup execution flag Sub_ON is set to 1 (YES to the step S603), the controller 106 resets a variable n indicative of the number of times of execution of image pickup for AF evaluation value calculation to 0 (step S610). In this step, the AF evaluation value calculation image pickup is performed at a frame rate three times higher than the frame rate in the live view image pickup, and hence when the variable n is equal to 0, 1, or 2, the AF evaluation value calculation image pickup is performed.

Then, the controller 106 performs image pickup for AF evaluation value calculation as described above (step S611). In image pickup for AF evaluation value calculation, the AF selection rows, shown in FIG. 4, are read out, and image signals different from those for live view image are read out. That is, image pickup for AF evaluation value calculation is performed at a timing independent of the live view image pickup.

Next, the contrast AF evaluation value calculation section 1041 calculates the contrast AF evaluation value AFC_2 (second contrast evaluation value which is a second evaluation value) based on the image signals obtained by image pickup for AF evaluation value calculation under the control of the controller 106 (step S612). Then, the controller 106 calculates a feedback controlled variable based on the contrast AF evaluation value AFC_2, and drivingly controls the drive circuit 103 to drive the AF mechanism provided in the optical mechanism section 1011 according to the calculated feedback controlled variable.

Then, the controller 106 determines whether or not the contrast AF evaluation value AFC_2 is within the range defined by the contrast minimum threshold value C_Min and the contrast maximum threshold value C_Max (step S613). In this step, the controller 106 determines whether or not the contrast AF evaluation value AFC_2 is within the range defined by the contrast minimum threshold value C_Min and the contrast maximum threshold value C_Max. Then, if the value is within the range, the controller 106 determines that the in-focus position can be estimated by the contrast AF control, and the high-speed AF operation is not required to be further performed on the next frame et seq.

If C_Min<AFC_2<C_Max holds (YES to the step S613), the controller 106 sets the AF evaluation value calculation image pickup execution flag Sub_ON to 0 (step S614). Further, the controller 106 increments the variable n by 1, which indicates the number of times of execution of image pickup for AF evaluation value calculation (step S615). On the other hand, if AFC_2≤C_Min or C_Max≤AFC_2 holds (NO to the step S613), the controller 106 directly proceeds to the step S615.

Then, the controller 106 checks whether or not the variable n is equal to "3" (step S616). If the variable n is not equal to 3 (NO to the step S616), the controller 106 returns to the step S611 to perform image pickup for AF evaluation value calculation again. On the other hand, if the variable n is equal to 3 (YES to the step S616), the controller 106 proceeds to the step S604, and calculates the AF evaluation value AFC_1 by the phase difference AF evaluation value calculation section 1042 as described above.

As described above, in the first embodiment of the present invention, when the phase difference AF evaluation value and the contrast AF evaluation value do not reach a predetermined level in image pickup for live view, image pickup for AF evaluation value calculation is performed at a higher frame rate than in image pickup for live view to thereby acquire the contrast AF evaluation value. Further, in image pickup for AF evaluation value calculation, the pixels different from those used in image pickup for live view are used, and these pixels are read out simultaneously with image pickup for live view. This makes it possible to prevent image quality of the live view image from being degraded, and what is more, reduce a time lag generated when the AF evaluation is performed.

Further, in the first embodiment of the present invention, image pickup for AF evaluation value calculation is performed only when required, and hence it is possible to reduce power consumption in the AF operation.

In other words, when an image corresponding to the first image signals is displayed, if the in-focus state cannot be obtained by the first focus control performed based on the first image signals, the second focus control is performed based on the second image signals obtained by second reading. More specifically, whether or not the in-focus state can be obtained is determined while performing the live view display, and whether or not to perform reading the second pixel group is determined according to a result of the above-mentioned determination. This makes it possible to prevent image quality of the live view image from being degraded and reduce power consumption, while performing the focus control at a high speed with high accuracy.

Although in the above-described first embodiment, the description has been given of the example in which the AF operation is performed when displaying the live view, this is not limitative, but the AF operation may be performed using the above-described method in any other timing in photographing a moving image.

As is clear from the above description, in the illustrated example in FIG. 1, the controller 106 and the drive circuit 103 function as a readout unit. Further, the controller 106 and the image display section 109 function as a display control unit, and the controller 106 and the drive circuit 103 function as a control unit.

Next, a description will be given of a second embodiment of the present invention. In the first embodiment, the description has been given of the example in which when displaying an image corresponding to the first image signals, whether or not the in-focus state is obtained is determined by the first focus control which is performed based on the first image signals, and according to the result of the determination, whether or not to perform reading the second pixel group is determined. On the other hand, in the second embodiment, a description will be given of the conditions for reading out the second pixel group when displaying an image corresponding to the first image signals, which is different from the conditions described in the first embodiment. Note that the conditions described in the second embodiment can be applied to a digital still camera having the configuration described in the first embodiment.

Figure 8:
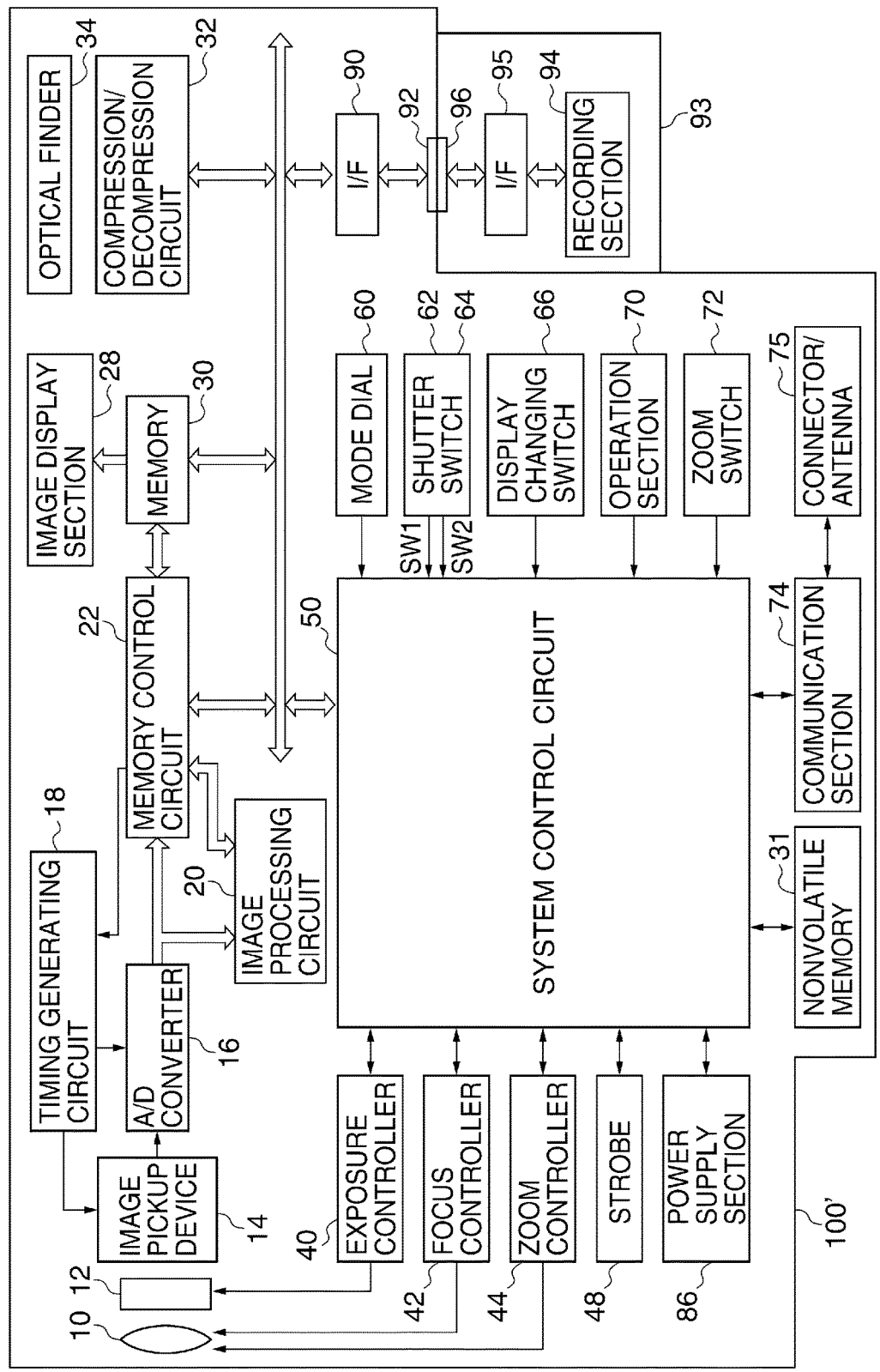
FIG. 8 is a schematic block diagram of a digital still camera as an image pickup apparatus according to a second embodiment of the present invention.

FIG. 8 is a schematic block diagram of a digital still camera as an image pickup apparatus according to the second embodiment of the present invention.

Referring to FIG. 8, the digital still camera, denoted by reference numeral 100', of the present embodiment, includes a photographic lens 10, a mechanical shutter 12 equipped with a diaphragm function, an image pickup device 14 that converts an optical image into an electric signal, an A/D converter 16 that converts an analog signal output from the image pickup device 14 to a digital signal, and so on. A timing generating circuit 18 is controlled by a memory control circuit 22 and a system control circuit 50 to supply a clock signal and a control signal to the image pickup device 14 and the A/D converter 16. Note that the electric charge accumulation time can be controlled not only by the shutter 12, but also by controlling the timing of resetting the image pickup device 14 as an electronic shutter, which can be applied to photographing of a moving image. Note that the image pickup device 14 may have the same configuration as that of the image pickup device 102 described in the first embodiment. In this case, the components incorporated in the image pickup device 14 and shown as blocks in FIG. 8 can be omitted from illustration.

An image processing circuit 20 performs predetermined pixel interpolation processing and color conversion processing on data output from the A/D converter 16 or data output from the memory control circuit 22. Further, image segmentation processing and scaling processing are performed by the image processing circuit 20, whereby an electronic zoom function is realized. Further, the image processing circuit 20 performs processing for identifying an image of image data, and detecting an amount of change from a preceding frame image.

Further, the image processing circuit 20 performs predetermined calculation processing using image data obtained by performing image pickup, and the system control circuit 50 performs AF processing, AE processing, and EF processing, by a TTL method, based on the obtained calculation result, to control an exposure controller 40 and a focus controller 42. Further, the image processing circuit 20 performs predetermined calculation processing using image data obtained by performing image pickup, and also performs AWB (auto-white balance) processing by the TTL method based on the obtained calculation result.

The memory control circuit 22 controls the A/D converter 16, the timing generating circuit 18, the image processing circuit 20, a memory 30, and a compression/decompression circuit 32. The data output from the A/D converter 16 is written into the memory 30 via the image processing circuit 20 and the memory control circuit 22, or directly via the memory control circuit 22. The memory 30 stores photographed still image data and moving image data. Further, the memory 30 can also be used as a work area for the system control circuit 50.

An image display section 28 is formed by a TFT, an LCD, or the like. The image data to be displayed, which has been written into the memory 30, is displayed by the image display section 28 via the memory control circuit 22. By sequentially displaying the image data obtained by performing image pickup on the image display section 28, it is possible to realize an electronic viewfinder function for displaying an image of an object on the image display section 28 before photographing a still image.

The system control circuit 50 controls the overall operation of the digital still camera 100. Program codes executed by the system control circuit 50 are written in a nonvolatile memory 31, such as a flash ROM, and are sequentially read out. Further, the nonvolatile memory 31 is provided with an area for storing system information and an area for storing user setting information, and various information and setting values are read out from the nonvolatile memory 31 at the next startup of the camera.

The compression/decompression circuit 32 is a circuit for compressing/decompressing image data by executing adaptive discrete cosine transform (ADCT) or the like. The compression/decompression circuit 32 reads an image stored in the memory 30, performs compression or decompression processing on the read image, and writes the processed data in the memory 30.

The exposure controller 40 controls the shutter 12, and further has a strobe light control function by cooperating with a strobe 48. The focus controller 42 controls focusing of the photographic lens 10, and a zoom controller 44 controls zooming of the photographic lens 10. The strobe 48 has not only the strobe light control function, but also a function of emitting AF auxiliary light. The exposure controller 40 and the focus controller 42 are controlled by the TTL method, and the system control circuit 50 controls the exposure controller 40 and the focus controller 42 based on a calculation result obtained from the image processing circuit 20 that performs calculation processing on the image data obtained by performing image pickup.

A mode dial 60 sets a function mode by switching between a power off mode, an automatic photographing mode, a photographing mode, a panorama photographing mode, a moving image photographing mode, a reproduction mode, and a PC connection mode.

A shutter switch (SW1) 62 is turned on when the operation of pressing a shutter button is halfway through, to thereby instruct the start of the operations, including AF (auto-focus) processing, AE (auto-exposure) processing, and AWB (auto-white balance) processing.

A shutter switch (SW2) 64 is turned on when the operation of pressing the shutter button is completed, and in the case of photographing with the strobe, the system control circuit 50 performs EF (light control) processing, and then cause the image pickup device 14 to be exposed for an exposure time period determined by AE processing. Then, the system control circuit 50 causes the strobe 48 to emit light during the exposure time period, and shields light by the exposure controller 40 simultaneously with termination of the exposure time period to thereby terminate exposure to the image pickup device 14.

Further, when the shutter switch (SW2) 64 is turned on, the system control circuit 50 executes read-out processing for writing into the memory 30 image data obtained by the A/D converter 16 and the memory control circuit 22 based image signals read out from the image pickup device 14.

Further, when the shutter switch (SW2) 64 is turned on, the system control circuit 50 performs development processing by operations of the image processing circuit 20 and the memory control circuit 22, and processing for reading image data from the memory 30 and compressing the image data by the compression/decompression circuit 32. Further, when the shutter switch (SW2) 64 is turned on, the system control circuit 50 performs recording processing for writing the image data in a recording medium 93.

A display changing switch 66 switches the display on the image display section 28. By using this function, when performing photographing using an optical finder 34, electric power supply to the image display section 28 is cut off, whereby it is possible to achieve power saving.

An operation section 70 is formed by various buttons, a touch panel, a rotating dial, and so on, and for example, includes a menu button, a set button, a macro button, a multi-screen reproduction page break button, a strobe setting button, a moving image recording switch, a single shooting/continuous shooting/self-timer switching button. Further, the operation section 70 includes a power switch, a to-submenu + (plus) button, a to-menu − (minus) button, a reproduction image forward + (plus) button, a reproduction image backward − (minus) button, a photographing image quality selection button, an exposure correction button, and a date/time setting button.

A zoom switch 72 is a switch with which the user instructs to change the magnification of a photographed image. The zoom switch 72 includes a telescopic switch and a wide switch, which change a photographic angle of view to a telescope side and a wide angle side, respectively. The zoom switch 72 functions as a trigger for instructing the zoom controller 44 to change the photographic angle of view of the photographic lens 10 and perform an optical zoom operation. Further, the zoom switch 72 also functions as a trigger for segmenting an image by the image processing circuit 20, and electronically changing the photographic angle of view (zooming) by pixel interpolation processing and so forth.

A power supply section 86 is formed by a primary battery, such as an alkaline battery, a secondary battery, such as an NiCd battery, an NiMH battery, and an Li ion battery, and an AC adapter. An interface 90 is an interface with the recording medium 93, and the recording medium 93 is connected to a connector 92. The recording medium 93 is implemented by a memory card, a hard disk, or the like, and includes a recording section 94, such as a semiconductor memory and a magnetic disk, an interface 95 which is an interface with the digital still camera 100', and a connector 96 which is connected to the connector 92.

The optical finder 34 makes it possible to perform photographing without using an electronic finder function by the image display section 28. A communication section 74 has various communication functions, such as an USB, IEEE 1394, a LAN, and wireless communication. A connector/antenna 75 is a connector used for connecting the digital still camera 100 to another device by the communication section 74, or an antenna for wireless communication.

Figure 9:
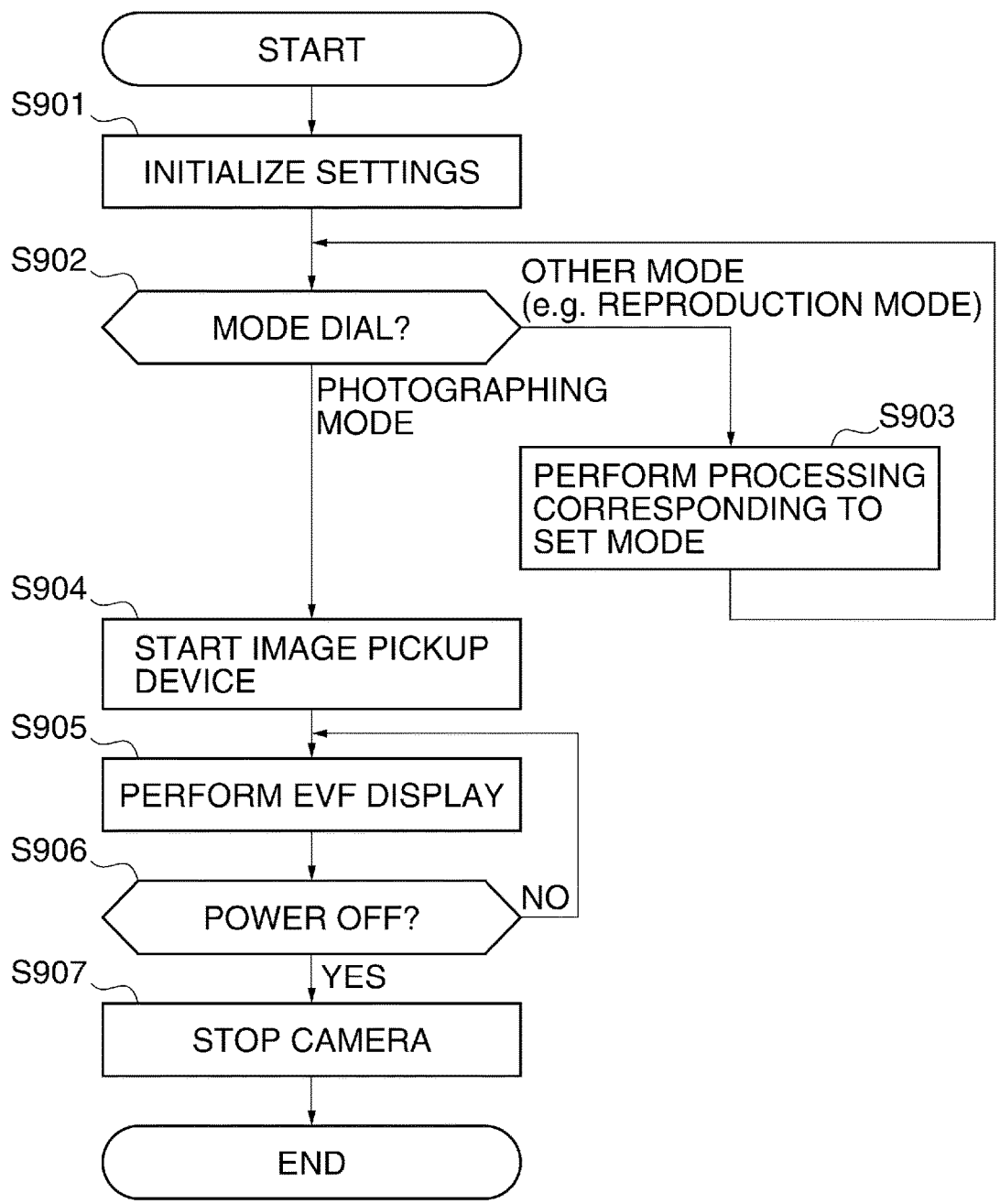
FIG. 9 is a flowchart of a control process for controlling the operation of the digital still camera.

FIG. 9 is a flowchart of a control process for controlling the operation of the digital still camera 100'. The control process in FIG. 9 is realized e.g. by a CPU of the system control circuit 50 which loads a program stored in the nonvolatile memory 31 into the memory 30 and executes the program.

When the digital still camera 100' is started in response to the supply of power by turning on a power button, not shown, the present control process is started, and in a step S901, the system control circuit 50 initializes flags, control variables, etc., and proceeds to a step S902.

In the step S902, the system control circuit 50 judges a set position of the mode dial 60. Then, if the mode dial 60 is set to the photographing mode, the system control circuit 50 proceeds to a step S904, whereas if the mode dial 60 is set to a mode other than the photographing mode (e.g. reproduction mode), the system control circuit 50 proceeds to a step S903.

In the step S903, the system control circuit 50 performs processing according to the set mode, and returns to the step S902 after execution of the processing.

In the step S904, the system control circuit 50 starts the image pickup device 14, and proceeds to a step S905. The image pickup device 14 is started in a reading mode with a plurality of frame rates (acquisition speeds). In this case, a read-out frame rate used when performing display of a moving image of an object on the image display section 28 before photographing a still image (hereinafter referred to as the EVF display) is set to 30 fps, and a read-out frame rate used for AF processing, AE processing, and AWB processing is set to 240 fps.

In the following description, a stream of frames read out at the rate of 30 fps is referred to as the main stream, and a stream of frames read out at the rate of 240 fps which is higher than the rate of the main stream is referred to as the sub stream.

The main stream corresponds to an example of an output from a first readout unit configured to acquire image data from the image pickup device of the present invention by thinning read lines, and output the acquired image data. Further, the sub stream corresponds to an example of an output from a second readout unit configured to acquire image data from read lines of the image pickup device of the present invention, which do not overlap with those read by the first readout unit, at a higher speed than the first readout unit, and output the image data simultaneously with the output from the first readout unit.

In the step S905, the system control circuit 50 sets the state of the camera to the EVF display state for sequentially displaying the image data read out from the main stream on the image display section 28, and proceeds to a step S906.

In the step S906, the system control circuit 50 determines whether or not the power switch of the operation section 70 is turned off, and if the power switch is turned off, the system control circuit 50 proceeds to a step S907, whereas if not, the system control circuit 50 returns to the step S905, and continues the EVF display state.

In the step S907, the system control circuit 50 stops the operation of the camera to stop the EVF display state set in the step S905, followed by terminating the present process.

FIG. 10 is a diagram showing conditions for controlling the start and end of reading the sub stream of the image pickup device 14 in a state where image data read by the main stream is being displayed on the EVF display. Note that the reading terminating conditions of the sub stream in FIG. 10 are conditions set in advance to achieve the respective purposes in association with reading starting conditions of conditions A to E.

The condition A in FIG. 10 corresponds to a case where the state of the main object changes during the EVF display. The system control circuit 50 checks the position of the main object by the image processing circuit 20, and starts reading the sub stream in respective cases where the sight of the main object is lost and where the main object has moved to any one of four corners of the display screen of the image display section 28. Further, also in a case where the main object has moved close to a framework which is automatically set on an arbitrary position within the display screen according to a user's manual operation or a predetermined algorithm, the system control circuit 50 starts reading the sub stream.

Thereafter, the system control circuit 50 detects the main object by the image processing circuit 20 based on the image data read by the sub stream, performs AF processing, AE processing, and AWB processing on the main object, and terminates reading the sub stream when AF processing, AE processing, and AWB processing are finished. The case where AF processing is finished is a case where the phase difference AF evaluation value and the contrast AF evaluation value, described in the first embodiment, reach respective predetermined levels. The case where AE processing is finished is a case where exposure suitable for the object is set. The case where AWB processing is finished is a case where gains to be applied to the image signals of the R, G, and B pixels of the image pickup device 14 are properly set. Further, if the main object cannot be detected by the image processing circuit 20 for a few frames, the system control circuit 50 terminates reading the sub stream.

The condition B in FIG. 10 corresponds to a case where the face detection result changes during the EVF display. The system control circuit 50 performs face detection by the image processing circuit 20, and if the number of faces increases or decreases, the system control circuit 50 starts reading the sub stream.

Then, the system control circuit 50 detects the main object by the image processing circuit 20, speedily determines a face on which AF processing, AE processing, and AWB processing are to be performed, and terminates reading the sub stream when the processing operations are finished.

Further, if the photographing mode is set to a smile shutter mode by using the mode dial 60, and a face is detected by the image processing circuit 20, the system control circuit 50 starts reading the sub stream. Then, if the face ceases to be detected by the image processing circuit 20, or if still image photographing is completed e.g. after a pressing operation of the release button, the system control circuit 50 terminates reading the sub stream. The photographing mode and face detection will be described hereinafter.

The condition C in FIG. 10 corresponds to a case where there is a change in scene determination on an object during the EVF display. In a case where the photographing mode is set to a scene determination mode by the mode dial 60 and there is a change in scene determination by the image processing circuit 20, the system control circuit 50 starts reading the sub stream. Further, if there is a rapid change in AF processing, AE processing, and AWB processing performed by the image processing circuit 20, the system control circuit 50 starts reading the sub stream.

Thereafter, the system control circuit 50 performs AF processing, AE processing, and AWB processing on the object by the image processing circuit 20 to thereby speedily perform image processing suitable for the scene, and terminates reading the sub stream when AF processing, AE processing, and AWB processing are stabilized.

The condition D in FIG. 10 corresponds to a case where an object moves fast during the EVF display. The system control circuit 50 judges a movement speed of the object by the image processing circuit 20, and if the movement speed is high, the system control circuit 50 starts reading the sub stream.

Then, the system control circuit 50 performs AF processing, AE processing, and AWB processing on the object by the image processing circuit 20, and terminates reading the sub stream when the movement of the object is stopped.

The condition E in FIG. 10 corresponds to a case where there is a change in the user's operation of any of the operation section 70, the mode dial 60, and the zoom switch 72 during the EVF display. If the mode is changed from the reproduction mode to the photographing mode by the mode dial 60, the system control circuit 50 starts reading the sub stream. Then, the system control circuit 50 performs AF processing, AE processing, and AWB processing on the object by the image processing circuit 20, and terminates reading the sub stream when AF processing, AE processing, and AWB processing are stabilized.

Further, in a case where the photographing mode is changed by the mode dial 60, for example, a case where the photographing mode is changed from a sunset photographing mode to a portrait mode, the system control circuit 50 starts reading the sub stream. Then, the system control circuit 50 performs AF processing, AE processing, and AWB processing on the object by the image processing circuit 20, and terminates reading the sub stream when AF processing, AE processing, and AWB processing are stabilized.

Further, if the zoom magnification is changed by the zoom switch 72, the system control circuit 50 starts reading the sub stream. Then, the system control circuit 50 performs AF processing, AE processing, and AWB processing on the object by the image processing circuit 20, and terminates reading the sub stream when AF processing, AE processing, and AWB processing are stabilized.

Further, if it is determined by the image processing circuit 20 that the luminance of the object is lower than a predetermined threshold value set for the main stream under any of the conditions A to E in FIG. 10, the system control circuit 50 controls the image pickup device 14 not to start reading the sub stream. This is because the sub stream is higher in frame rate than the main stream, and an upper limit of the exposure time period of each frame is limited, and hence acquired image data cannot be always used for AF processing, AE processing, and AWB processing. For example, when the frame rate of the sub stream is set to 240 fps, the exposure time period of each frame is 1/240 sec. at the maximum, and hence it is sometimes impossible to set a sufficient exposure time period for a low-luminance object, making the acquired image data so dark that the main object cannot be detected.

FIG. 11 is a timing diagram showing a sequence for controlling the image pickup device 14, which is performed when any of the conditions A to E, shown in FIG. 10, are satisfied.

As shown in FIG. 11, if at least one of the conditions for starting reading the sub stream in any of the conditions A to E in FIG. 10 is satisfied during the EVF display, reading of the sub stream of the image pickup device 14 is started. Then, if the associated condition for terminating reading the sub stream is satisfied, reading of the sub stream of the image pickup device 14 is terminated.

Next, the photographing mode will be described in detail. The photographing mode includes an auto mode, a manual mode, a plurality of scene-specific photographing modes, and the smile shutter mode. The auto mode is a mode in which various parameters are automatically determined by a program stored in the nonvolatile memory 31 based on a measured exposure value.

The manual mode is a mode in which a user can freely change various parameters of the camera. The smile shutter mode is a mode for detecting a smile of an object, and if a smile is detected, still image photographing is automatically performed.

The scene-specific photographing modes are photographing modes for respective types of scenes, which are realized by combining a shutter speed, an aperture value, a strobe light emission state, sensitivity setting, white balance setting, and so forth, which are suitable for a specific type of scene to be photographed. For example, the digital still camera 100' according to the present embodiment has the following scene-specific photographing modes (1) to (5). The scene-specific photographing modes are not limited to these modes.

(1) night scene photographing mode: a mode specialized for a night scene, in which a strobe light illuminates a person, and the background is recorded at a low shutter speed (2) skyrocket photographing mode: a mode for vividly photographing skyrockets at an optimum exposure (3) sunset photographing mode: a mode for photographing a scene in a manner emphasizing silhouette and red (4) portrait photographing mode: a mode specialized for photographing a person in a state highlighted against the background which defocused (5) sport photographing mode: a mode set to be specialized for photographing an object which is moving fast Next, face detection performed by the image processing circuit 20 will be described in detail. The image processing circuit 20 performs band-pass filtering on image data on which face detection is to be performed, in the horizontal and vertical directions, to thereby detect edge components from the image data.

The image processing circuit 20 performs pattern matching on the detected edge components to extract candidates of eyes, noses, mouths, and ears. Then, the image processing circuit 20 judges, out of the extracted candidates, ones which satisfy conditions set in advance (e.g. a distance and an inclination between two eye candidates), a pair of eyes, thereby narrowing the eye candidates by selecting only those judged as pairs of eyes.

Further, the image processing circuit 20 associates the narrowed eye candidates with the other parts (nose, mouth, and ear) forming a face in combination with each pair of the candidate eyes, and further, detects a face by passing the associated parts through a non-face condition filter set in advance. Then, the image processing circuit 20 outputs the above-mentioned face information according to a result of face detection, and terminates the process. At this time, feature values including the number of faces are stored in the memory 30.

As described above, the image processing circuit 20 can perform image analysis on the image data to be displayed for the EVF display or to be displayed by reproduction, and extract the feature values of the image data to thereby detect the object information. Although in the present embodiment, the face information is taken as an example of the object information, the object information includes not only the face information, but also other various information, such as red-eye determination, eye detection, closed-eye detection, and smile detection.

Note that face AE processing and face WB processing can be performed simultaneously with face AF processing. The face AE processing is processing for controlling exposure according to brightness of a detected face. The face WB processing is processing for controlling white balance of the whole screen according to the color of a detected face.

As described above, in the second embodiment, the conditions for starting reading the sub stream and the conditions for terminating the same are set. Particularly, in the conditions A to D in FIG. 10, the system control circuit 50 starts the control for reading the second area of the image pickup device 14 based on the first image pickup signals obtained by performing the control for reading the first area of the image pickup device 14. By setting the conditions for starting reading the sub stream and the conditions for terminating the same as described above, it becomes unnecessary to temporarily stop image pickup by the image pickup device 14, to thereby improve the operability of the digital still camera 100' and achieve power saving.

Further, although in the second embodiment, a plurality of the conditions for starting reading the sub stream and the conditions for terminating the same are described by way example, it is unnecessary to follow all of the start conditions and terminating conditions, but it is only required that reading of the sub stream is started and terminated according to at least one of the start conditions and the termination conditions.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-254910 filed Dec. 10, 2013, and Japanese Patent Application No. 2013-259304 filed Dec. 16, 2013, which are hereby incorporated by reference herein in their entirety.

What is claimed is:

1. An image pickup apparatus that utilizes image data to display a live view image and perform processing for image pickup, the apparatus comprising:
    an image pickup device including first pixels and second pixels, the second pixels being exclusive of the first pixels; and
    a control unit configured to read out, at a first frame rate, first image data from the first pixels of the image pickup device, and read out, at a second frame rate higher than the first frame rate, second image data from the second pixels of the image pickup device simultaneously with the reading out of the first image data,
    wherein said control unit starts control for reading out the second image data simultaneously with the reading out of the first image data, based on the first image data which has already been read out.

2. The image pickup apparatus according to claim 1, further comprising a determination unit configured to determine whether or not a state of an object has changed, based on the first image data which has already been read out,
    wherein when said determination unit determines that a state of the object has changed, said control unit starts the control for reading out the second image data simultaneously with the reading out of the first image data.

3. The image pickup apparatus according to claim 1, further comprising an object detection unit configured to detect an object based on the first image data which has already been read out,
    wherein said control unit starts the control for reading out the second image data simultaneously with the reading out of the first image data, based on a change of the position of the object detected by said object detection unit.

4. The image pickup apparatus according to claim 1, further comprising a face detection unit configured to detect a face of an object based on the first image data which has already been read out,
    wherein said control unit starts the control for reading out the second image data simultaneously with the reading out of the first image data, based on a result of the detection by said face detection unit.

5. The image pickup apparatus according to claim 1, further comprising a scene determination unit configured to determine a scene based on the first image data which has already been read out,
    wherein said control unit starts the control for reading out the second image data simultaneously with the reading out of the first image data, based on a change of the scene determined by said scene determination unit.

6. The image pickup apparatus according to claim 1, further comprising a calculation unit configured to calculate an evaluation value based on the first image data which has already been read out,
    wherein said control unit starts the control for reading out the second image data simultaneously with the reading out of the first image data, based on a change of the evaluation value calculated by said calculation unit.

7. The image pickup apparatus according to claim 1, further comprising an object detection unit configured to detect an object based on the first image data which has already been read out,
    wherein said control unit starts the control for reading out the second image data simultaneously with the reading out of the first image data, based on a movement speed of the object detected by said object detection unit.

8. The image pickup apparatus according to claim 1, further comprising a calculation unit configured to calculate a focus evaluation value based on the first image data which has already been read out,
    wherein said control unit starts the control for reading out the second image data simultaneously with the reading out of the first image data, based on the focus evaluation value calculated by the calculation unit.

9. The image pickup apparatus according to claim 8, wherein said control unit starts the control for reading out the second image data simultaneously with the reading out of the first image data, when the focus evaluation value is not within a range set in advance.

10. The image pickup apparatus according to claim 8, wherein the evaluation value calculated by said calculation unit is a phase difference focus evaluation value.

11. The image pickup apparatus according to claim 8, wherein the evaluation value calculated by said calculation unit is a contrast focus evaluation value.

12. The image pickup apparatus according to claim 1, wherein when a predetermined condition is satisfied after starting control for reading out the second image data, said control unit terminates controlling for reading out the second image data.

13. The image pickup apparatus according to claim 1, further comprising a processing unit configured to perform a focus processing based on the second image data which has already been read out.

14. The image pickup apparatus according to claim 1, further comprising a processing unit configured to perform an exposure processing based on the second image data which has already been read out.

15. The image pickup apparatus according to claim 1, further comprising a processing unit configured to perform a white balance processing based on the second image data which has already been read out.

16. The image pickup apparatus according to claim 1, wherein the control unit is configured to cause display of an image which is based on the first image data which has already been read out on an image display section.

17. A control method of an image pickup apparatus that comprises an image pickup device and that utilizes image data to display a live view image and perform processing for image pickup, the method comprising:

reading out, at a first frame rate, first image data from first pixels of the image pickup device; and reading out, at a second frame rate higher than the first frame rate, second image data from second pixels of the image pickup device simultaneously with the reading out of the first image data, the second pixels being exclusive of the first pixels, and the reading out of the second image data being started based on the first image data which has already been read out.

* * * * *